(12) United States Patent
Gloss et al.

(10) Patent No.: US 11,047,546 B2
(45) Date of Patent: Jun. 29, 2021

(54) LIGHT DEVICE OF A MOTOR VEHICLE

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ); Vit Simurda, Novy Jicin (CZ); Milan Stylarek, Mikulcice (CZ); Vladimir Kubena, Bernartice nad Odrou (CZ)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 0 days.

(21) Appl. No.: 16/638,415

(22) PCT Filed: Aug. 20, 2018

(86) PCT No.: PCT/CZ2018/000038
§ 371 (c)(1),
(2) Date: Feb. 11, 2020

(87) PCT Pub. No.: WO2019/037803
PCT Pub. Date: Feb. 28, 2019

(65) Prior Publication Data
US 2020/0256539 A1 Aug. 13, 2020

(30) Foreign Application Priority Data

Aug. 22, 2017 (CZ) ................................ CZ2017-480
Jan. 30, 2018 (CN) .......................... 201810092470.3
Mar. 6, 2018 (CZ) ................................ CZ2018-107

(51) Int. Cl.
*F21S 43/00* (2018.01)
*F21S 43/239* (2018.01)
(Continued)

(52) U.S. Cl.
CPC ............ *F21S 43/239* (2018.01); *F21S 43/245* (2018.01); *F21S 43/26* (2018.01); *F21S 43/40* (2018.01);
(Continued)

(58) Field of Classification Search
CPC .......... F21S 43/239; F21S 43/40; F21S 43/26; F21S 43/245; G02B 6/0051; G02B 6/0055
See application file for complete search history.

(56) References Cited

U.S. PATENT DOCUMENTS 5,791,757 A    8/1998  O'Neil et al.
6,280,063 B1*  8/2001  Fong ..................... G02B 5/045
                                                              362/333
(Continued)

FOREIGN PATENT DOCUMENTS

DE   102011018508 A1   10/2012
GB       2537088 A     10/2016
(Continued)

OTHER PUBLICATIONS

International Search Report dated Dec. 12, 2018 in Corresponding PCT/CZ2018/000038 (4 pages).
(Continued)

*Primary Examiner* — Donald L Raleigh
(74) *Attorney, Agent, or Firm* — Hovey Williams LLP

(57) ABSTRACT

The light device comprises an internal chamber (2) that is covered by a translucent cover, which separates the light device from the external surroundings of the motor vehicle; inside the chamber, there is at least one lighting unit (3) whose active area (4) for the exit of light rays (10) from the lighting unit (3) is situated opposite the translucent cover and contains a light-conductive core (15) of an optically transparent material with an associated light unit (7) located
(Continued)

Figure 1:
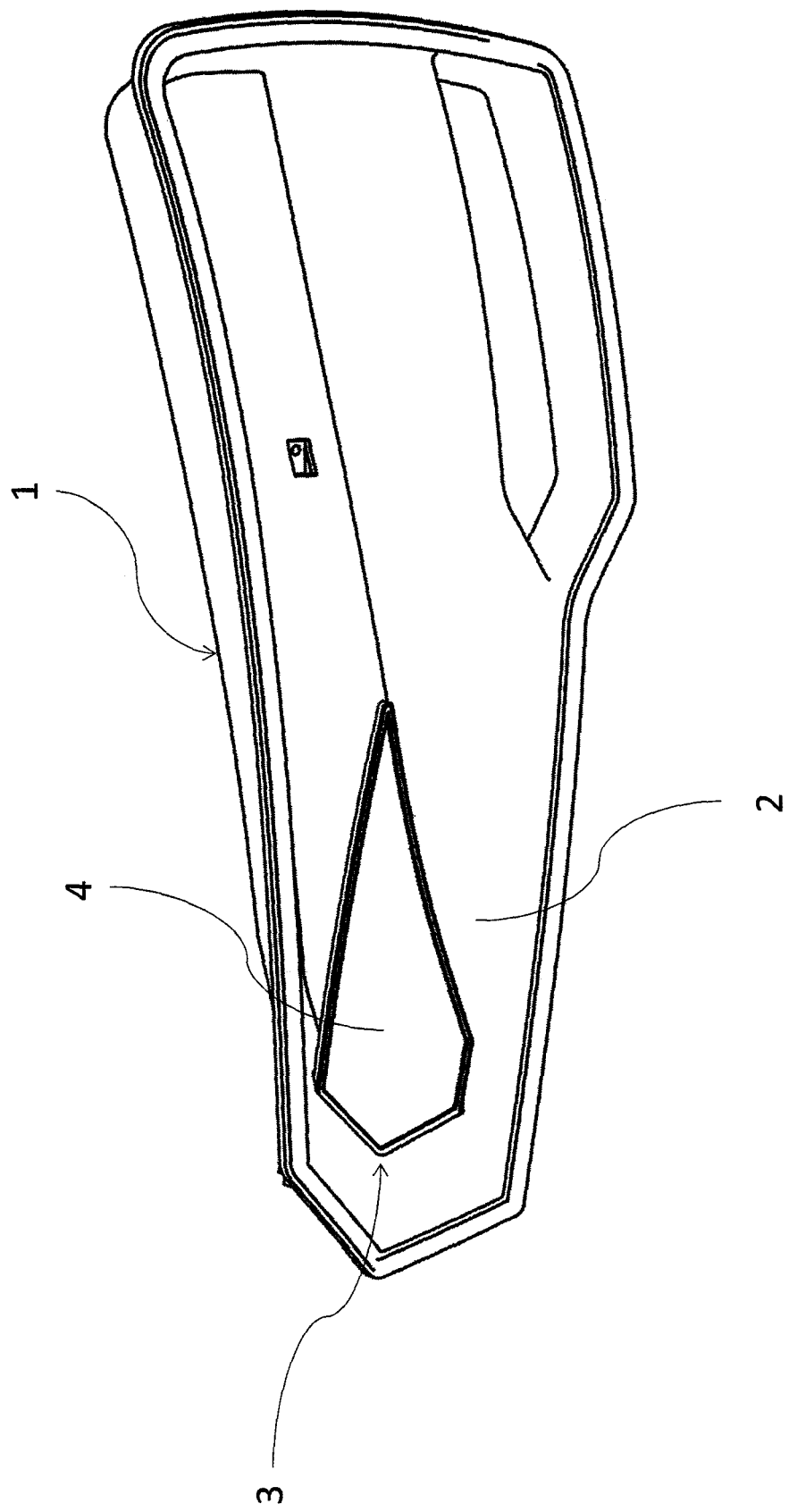

opposite the entry area (9) of the light-conductive core (15) to emit light rays (10) into the body (14) of light-conductive core (15). Between the light-conductive core (15) and the translucent cover there is a functional layer (23) configured to focus the beams of light rays (10) that exit its surface averted from the light-conductive core (15) in a predetermined direction. The light device comprises a technological layer (24) that is configured for a total reflection of the light rays (10), which is in contact with the top surface (17) of the light-conductive core (15).

24 Claims, 44 Drawing Sheets

(51) Int. Cl.
  *F21S 43/40* (2018.01)
  *F21S 43/245* (2018.01)
  *F21S 43/20* (2018.01)
  *F21V 8/00* (2006.01)

(52) U.S. Cl.
  CPC ......... *G02B 6/0051* (2013.01); *G02B 6/0055* (2013.01)

(56) References Cited

U.S. PATENT DOCUMENTS

| | | | |
|---|---|---|---|
| 7,651,241 B2 | 1/2010 | Kee | |
| 9,335,460 B1 | 5/2016 | Zhou | |
| 2007/0147072 A1* | 6/2007 | Scobbo | G02B 6/0033 362/607 |
| 2007/0279727 A1* | 12/2007 | Gandhi | G02B 6/0055 359/242 |
| 2008/0186726 A1 | 8/2008 | Okada | |
| 2009/0251917 A1* | 10/2009 | Wollner | F21S 43/239 362/543 |
| 2010/0309677 A1 | 12/2010 | Kazaoka | |
| 2011/0170315 A1 | 7/2011 | Chen | |
| 2011/0249939 A1 | 10/2011 | Schmidt et al. | |
| 2013/0033895 A1 | 2/2013 | Brown et al. | |
| 2014/0268873 A1 | 9/2014 | Holman et al. | |
| 2015/0036336 A1* | 2/2015 | Yang | F21K 9/60 362/235 |
| 2015/0092390 A1* | 4/2015 | Birman | G02B 6/002 362/23.14 |
| 2015/0331169 A1 | 11/2015 | Jang et al. | |
| 2015/0338054 A1 | 11/2015 | Kim et al. | |
| 2016/0349570 A1 | 12/2016 | Wu et al. | |
| 2016/0356942 A1 | 12/2016 | Cherekdjian et al. | |

FOREIGN PATENT DOCUMENTS

| | | |
|---|---|---|
| JP | 2000040412 A | 2/2000 |
| JP | 2010198992 A | 9/2010 |
| KR | 20080111786 A | 12/2008 |
| WO | 2008016978 A1 | 2/2008 |
| WO | 2013133603 A1 | 9/2013 |

OTHER PUBLICATIONS

Written Opinion of the International Searching Authority dated Dec. 12, 2018 in Corresponding PCT/CZ2018/000038 (7 pages).

* cited by examiner

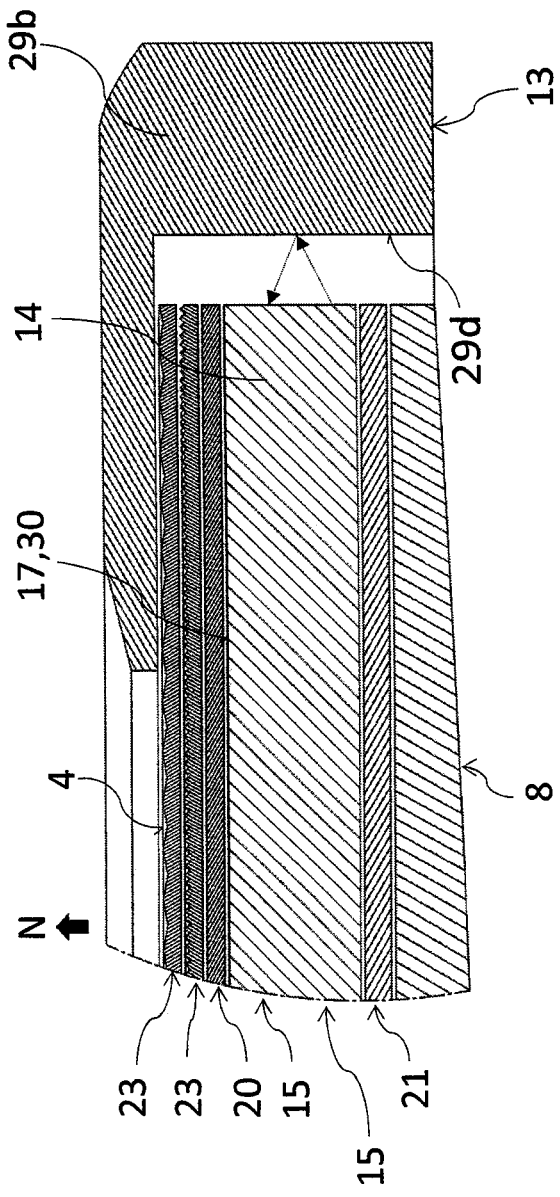

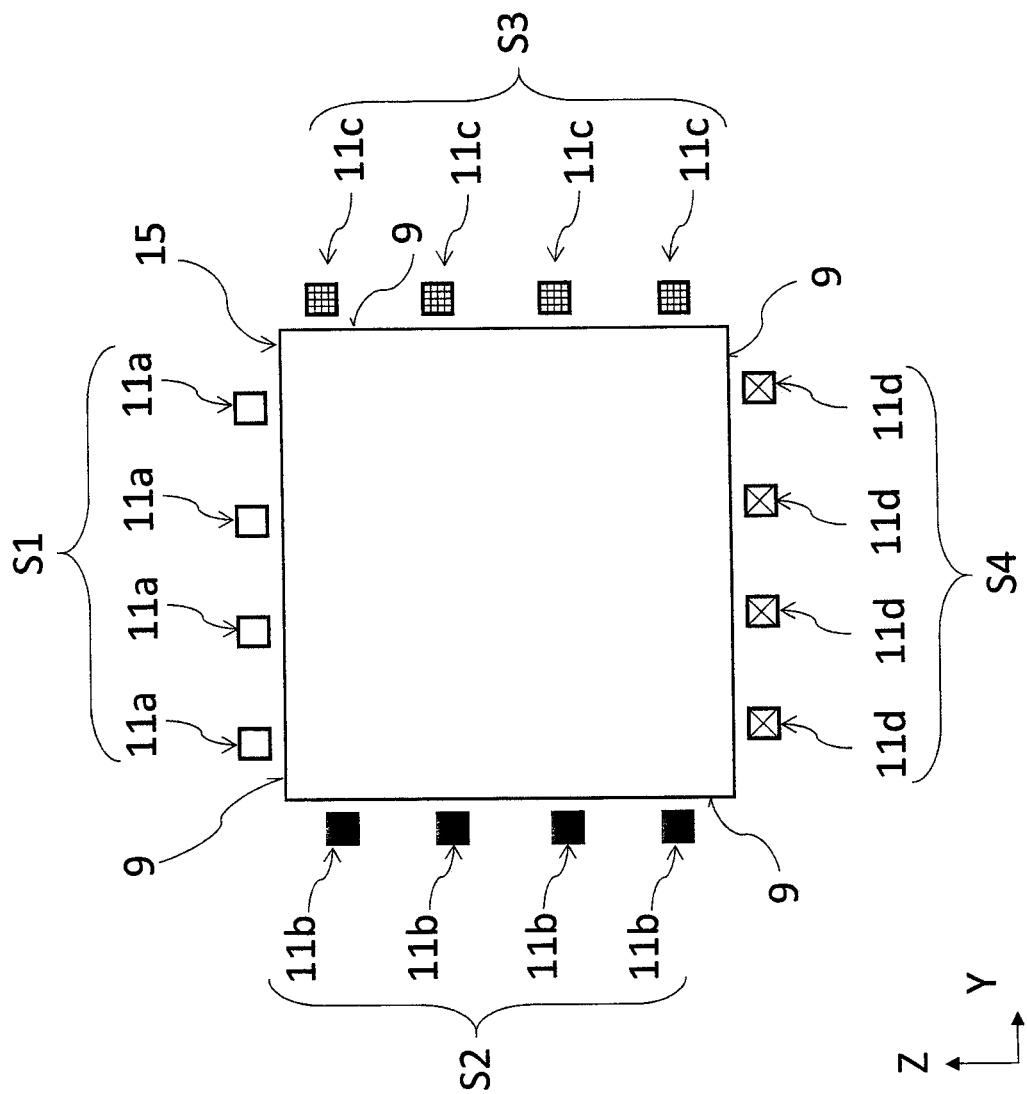

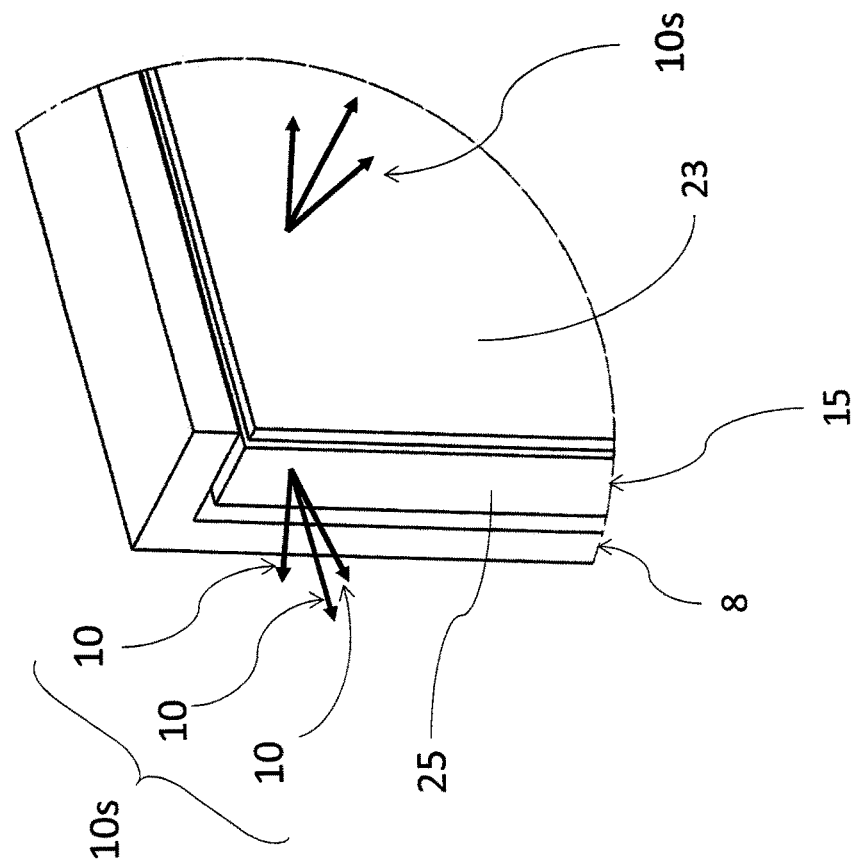
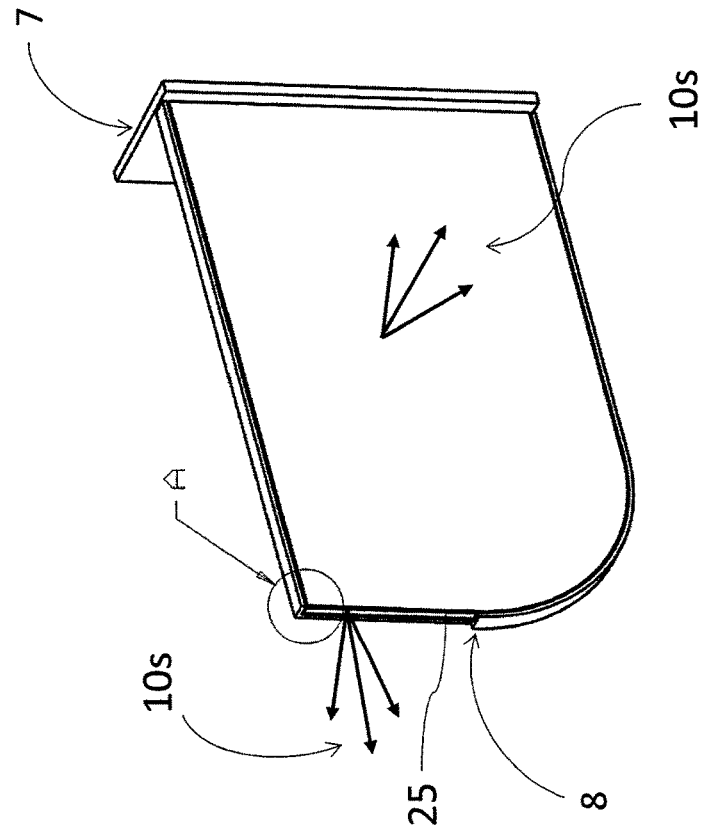
Fig. 46
Fig. 45

LIGHT DEVICE OF A MOTOR VEHICLE

RELATED APPLICATIONS

This application is the National Stage of International Patent Application No. PCT/CZ2018/000038, filed Aug. 20, 2018, which is hereby incorporated herein by reference in its entirety, and which claims priority to Czech Patent Application No. PV2017-480, filed Aug. 22, 2017, Chinese Patent Application No. CN 201810092470.3, filed Jan. 30, 2018, and Czech Patent Application No. PV 2018-107, filed Mar. 6, 2018, which are also incorporated herein by reference in their entirety.

FIELD OF THE INVENTION

The invention relates to a light device of a motor vehicle that comprises a planarly shaped lighting unit.

BACKGROUND INFORMATION

New vehicle lighting systems do not only focus the optical output increasing the driving comfort and traffic safety, but it is also the appearance that is important for modern light devices of motor vehicles as headlights or signal lamps of a motor vehicles. Modern point and planar light sources, especially LED and OLED sources, have opened a new chapter for new stylistic options of car designers.

Using a planar light source, especially OLED—Organic Light Emitting Diodes—brings not only an extension of designer possibilities of the emitted light function, but it is also characterized by certain technical benefits including e.g. compact installation dimensions, low heat production, low energy consumption etc. Unfortunately, there are still some limitations of the OLED technology preventing widespread deployment of this technology in the serial production of car lighting. E.g. service life, penetration of moisture, low luminance for power functions, limitation to planar surfaces only and last, but not least, a high price. Another drawback of the OLED technology is the fact that a lamp of a motor vehicle must be adapted do detect an error status of the light source. With conventional LED's, this condition can be detected relatively well because in most cases, a short circuit or diode disconnection occurs, which results in a change of an, electric quantity that can be relatively easily electronically detected. The situation of planar sources is more complicated because OLED's comprise organic layers that emit light after connection of electric voltage/current.

In the patent files U.S. Pat. Nos. 9,335,460, 7,651,241, 5,791,757, US20160356942, US20160349570, US20150331169, US20140268873, US20130033895, US20110249939, US20110170315, US20100309677, US20080186726, GB2537088, KR2008111786, there are many solutions that use a surface shaped lighting unit equipped with an exit area for the output of light rays without using organic substances such as OLED. The disadvantage of the above-mentioned design solutions is that these lighting units are not intended to be used as external lighting equipment for motor vehicles, for which a variety of technical specifications and regulatory requirements must be followed and fulfilled. There is also a requirement for low manufacturing and assembly costs of such devices. For example, chemically cured cover glass that is used in the manufacturing process of screens is unsuitable for use as a cover glass of motor vehicle headlights as its manufacturing costs are too high.

To achieve the highest possible efficiency of light devices, efficient binding of light rays, to light-guiding components must be ensured. Individual optical elements as a system of refractive and reflective surfaces and interfaces of optical environments must be arranged in such a way to prevent light losses to the highest possible extent, and at the same time to create an output light trace with the required light characteristic, i.e. the required light intensity and homogeneous appearance with constant luminance all over the exit surface.

Car lighting has certain specific features as it is not only the appearance and the total luminance of the lighting function that is concerned. Individual lighting functions must conform to locally valid legislative regulations (e.g. ECE, SAE, CCC etc.). Each function has different requirements for the minimal and maximal luminous intensity values at certain angles. This means that the purpose is not only to emit a certain amount of light from lighting elements. It is also necessary to emit light having certain luminous intensity at individual angles specified by the legislation. This luminous intensity is based on the minimum and maximum values in individual regulations for individual angles. A lighting function should be preferably designed in such a way to meet requirements of as many regulations as possible. So there is a certain overlap of the intervals of the specified minimum and maximum values for individual angles. In this case, a lamp or headlight can be used for more markets at the same time without changes. However, there are cases when the requirements of all regulations cannot be met with the use of a single design of a lighting function. In that case, the lighting function must be adapted to the requirements of individual markets, which results in a unique product for the particular market.

The requirements for the luminous intensity at individual angles are based on traffic safety requirements. This is because the primary task of signal lights is to make sure that a vehicle that emits a signal can be seen from angles that are critical for the particular function. All the signal functions (except the lateral ones) must emit light with the highest possible luminous intensity in the vehicle axis direction. The requirements for individual luminous intensity values at individual angles then decrease with the increasing angle of deflection from this axis. This decrease is gradual and does not approximate Lambert's distribution (cosine emitter). Thus, it is not desirable to strive to achieve this (Lambert's) distribution, which is close to the distribution that OLED lights or some displays work with. Concerning displays and TV screens, the aim is to ensure as constant luminance as possible from the widest possible viewing angles, which is a principal difference from the requirements for angular luminous intensities that light devices of motor vehicles, i.e. also the light device of a motor vehicle according to the present invention, are subject to.

As indicated above, fading at large viewing angles is rather considered as a defect in the case of displays and TV screens. On the other hand, signal lights of motor vehicles are subject to specifications what luminous intensities must be achieved at what angles to ensure safe visibility of a vehicle emitting a signal. In most cases, a light cone must be produced having the highest luminous intensity within the angle of +/−10° horizontally and +/−5° vertically from the longitudinal axis of the vehicle. Lower luminous intensities are then required up to the angles of +/−20° and +/−10° from the vehicle axis. These angles are required for the main beam, the luminous intensity of the main beam being several times higher than the required luminous intensity at the other angles. At the other angles, visibility is the relevant parameter. I.e. a requirement for the signal to be visible from a large range of angles. E.g. for the stop function, visibility is required in the angular range of +/−45° horizontally and +/−15° vertically. However, for the tail light and the turn indicator function the visibility angle out of the vehicle has been extended up to 80°. With regard to the production tolerances it is then important to design the light function in such a way as to always meet the required luminous intensity value at the particular angle. Therefore, the minimal and maximal values are designed with a certain angular and value margin. This e.g. means that if a minimal luminous intensity is required up to a certain angle, the function is mostly designed in such a way for this minimal value to exceed the given angular direction by at least 1.5°.

The above mentioned description implies that to efficiently meet the legislative regulations, the light must be directed specifically at individual angles.

Unlike displays and TV screens, in the automotive industry, the required shape of the output surface must further be considered. This is because in most cases, the use of a simple square or rectangular surface is not acceptable from a designer point of view. Today, the style of a car is a very important parameter and at the same time a limit for meeting technical and legislative requirements. Therefore, style must be combined with technological features to achieve the desired result. For this reason, within the design of the light-conductive core, the distribution and size of unbinding elements must be optimized.

The object of the invention is to introduce a new solution of lighting equipment of a motor vehicle comprising a planarly shaped lighting unit with an exit area of light rays. The lighting unit is supplied by point light sources, especially LED's and is fitted with optical elements to create signal light functions, the planarly shaped lighting unit offering designer advantages comparable to the OLED technology and at the same time ensuring that all technical specifications and legal requirements for use of lighting equipment in the automotive industry are fulfilled at acceptable manufacturing costs.

SUMMARY OF THE INVENTION

The above-mentioned objects of the invention are fulfilled by a light device of a motor vehicle comprising an internal chamber that is covered by a translucent cover, which separates the light device from the external surroundings of the motor vehicle; inside the chamber, there is at least one planarly shaped lighting unit whose active area for the exit of light rays from the lighting unit is situated opposite the translucent cover and contains a light-conductive core of an optically transparent material with an associated light unit located opposite the entry area of the light-conductive core to emit light rays into the body of the light-conductive core. Between the light-conductive core and the translucent cover there is a functional layer configured to focus the beams of light rays that exit its surface averted from the light-conductive core in a predetermined direction(s), the light device containing a technological layer that is configured for a total reflection of the light rays. This layer is in contact with the top surface of the light-conductive core.

In one of preferred embodiments, the functional layer is also configured for homogenization of light rays.

In one of preferred embodiments, the light device comprises a reflector situated against the bottom surface of the light-conductive core and configured to reflect light rays escaping through the bottom surface from the light-conductive core, and another technological layer that separates the light-conductive core from the reflector.

In another one of preferred embodiments, a homogenizer is situated between the functional layer and in contact with the technological layer, which is in contact with the top surface of the light-conductive core, configured to homogenize light rays exiting from its exit area. In another one of preferred embodiments, the light device comprises another technological layer that separates the homogenizer from the functional layer.

In another one of the preferred embodiments, the functional layer comprises functional elements that are arranged on its surface and/or are part of its internal structure, adapted to focus beams of light rays exiting from its surface averted from the light-conductive core in a pre-determined direction. The pre-determined direction may be a direction parallel or close to the normal to the said surface averted from the light-conductive core and/or a direction deflected from the normal to the said surface averted from the light-conductive surface by a pre-determined acute angle.

In another one of preferred embodiments, the functional layer comprises two planarly shaped segments arranged above each other that are fitted on their top surface with functional elements consisting of differently oriented functional textures, preferably shifted by 90° with respect to each other, the light device comprising another technological layer where this technological layer is located between the said segments.

The functional elements can be preferably arranged linearly on the surface and have a sharp-edged sawtooth profile or a sawtooth profile with rounded peaks.

The light-conductive core can be preferably on its bottom surface or on its body fitted with unbinding elements to direct light rays towards the top surface of the light-conductive core. The distribution and size of these elements are designed with respect to the required designer shape of the active surface to preferably provide the ratio of the minimal to maximal luminance of the active surface of at least 1:7.

In one of preferred embodiments, at least one of the technological layers consists of an air layer.

In another one of preferred embodiments, at least one of the technological layers comprises foil and/or spray coating and/or surface finish.

In another one of preferred embodiments, at least one of the technological layers comprises an adhesive layer, acting at the same time as a connecting element of two planarly shaped parts of the lighting unit it is positioned between.

The lighting unit can preferably comprise at least one clamping element in the form of a frame encircling the assembly of the planarly shaped parts of the lighting unit at least at a lateral side to hold these parts in the required position.

The lighting unit can preferably comprise separators to create the required thickness of the technological layers.

The separators can be part of the said frame.

In another one of preferred embodiments, the lighting unit comprises clamping elements situated in the technological layers to maintain their required thickness and to connect the respective pairs of planarly shaped parts of the lighting unit separated by these technological layers.

The clamping elements preferably consist of an adhesive layer and/or adhesive pads and/or laser or ultrasonic seals.

In one of preferred embodiments, the light sources of the lighting unit are LED sources.

The thickness of the lighting unit is preferably from 0.5 mm to 14 mm.

The lighting unit, and thus also the light-conductive core, technological layer and other layers, if contained in the lighting unit, can be spatially shaped.

CLARIFICATION OF DRAWINGS

Figure 2:
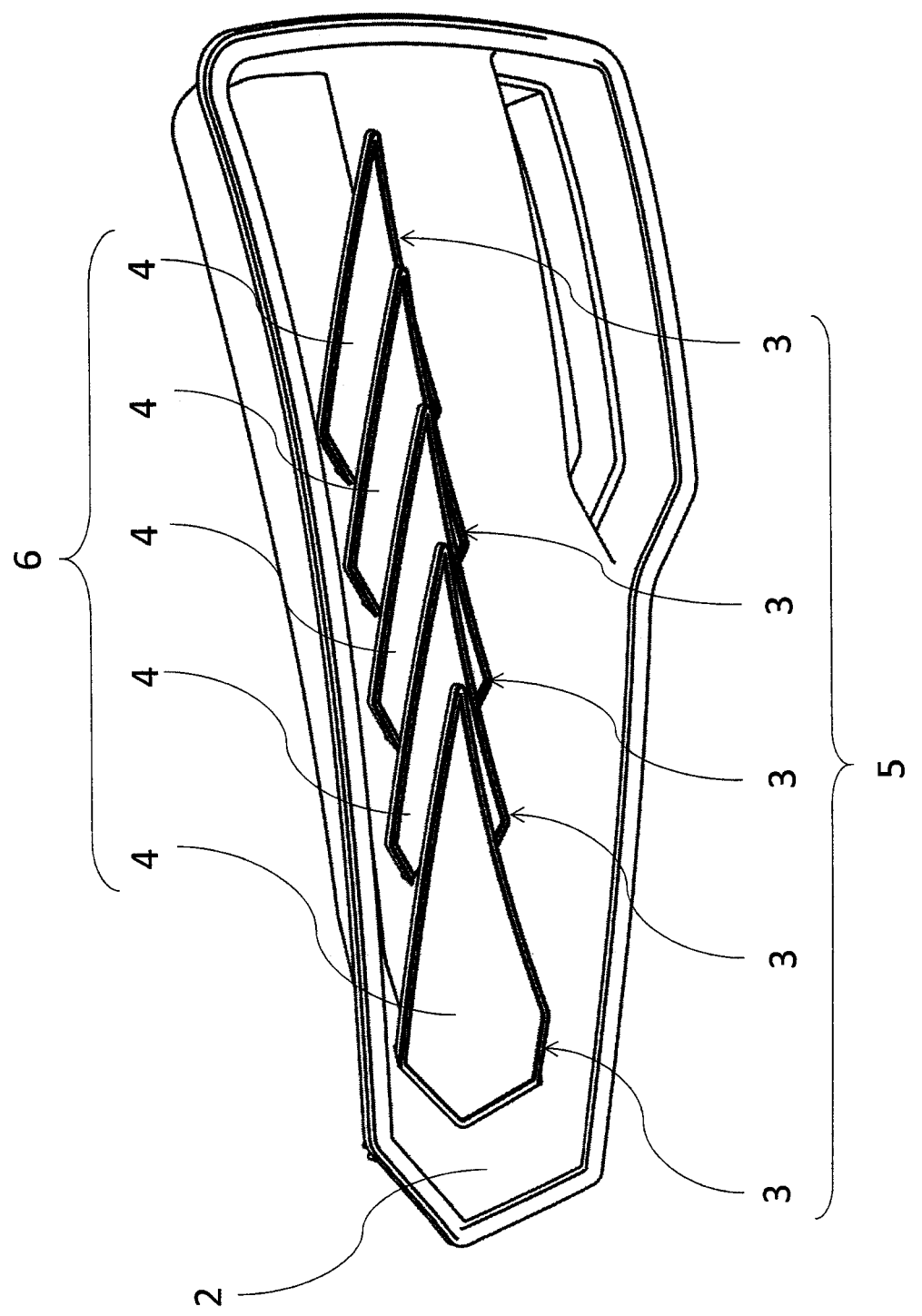
Figure 3:
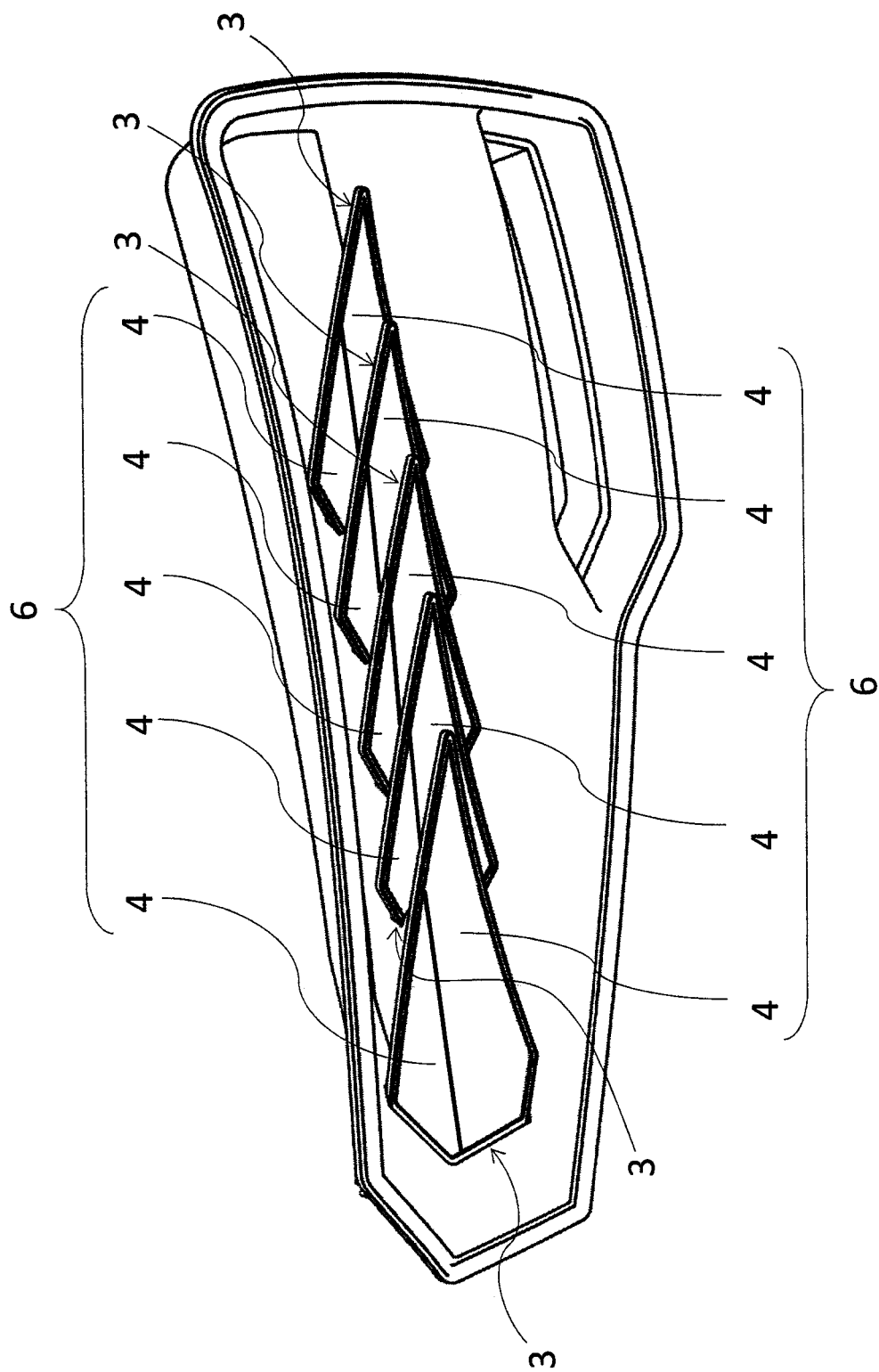
Figure 4:
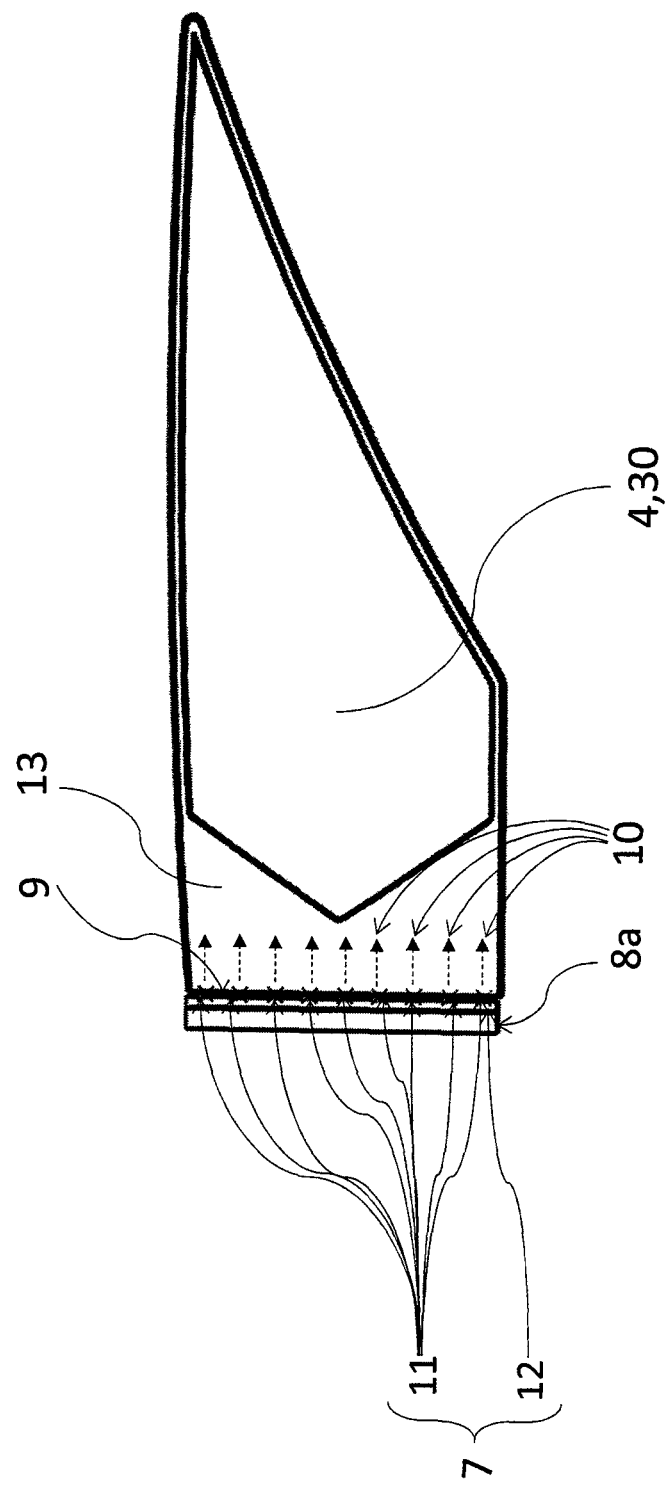
Figure 5A:
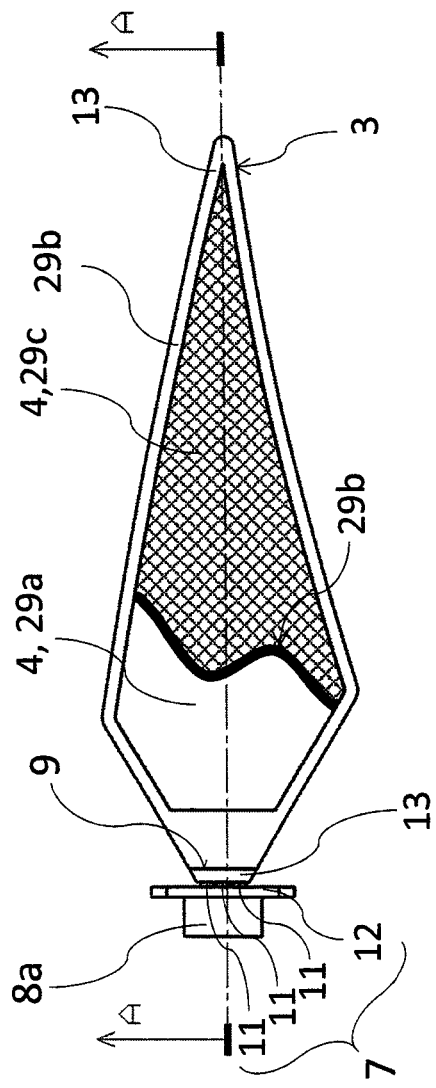
Figure 5B:
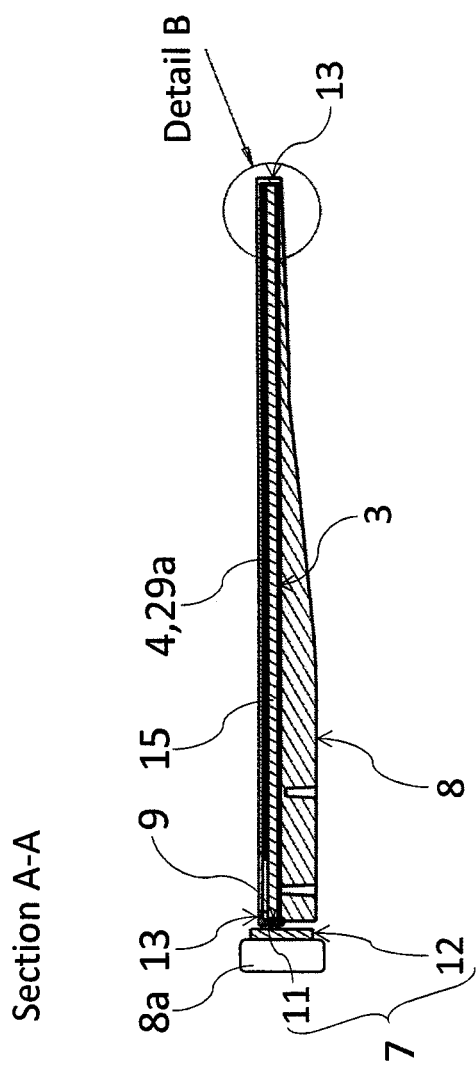
Figure 5C:
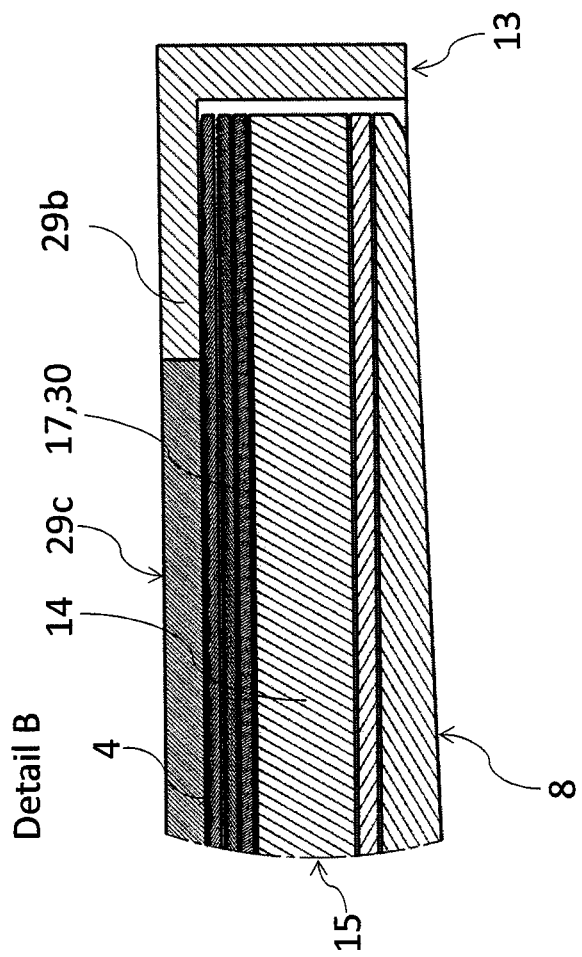
Figure 5D:
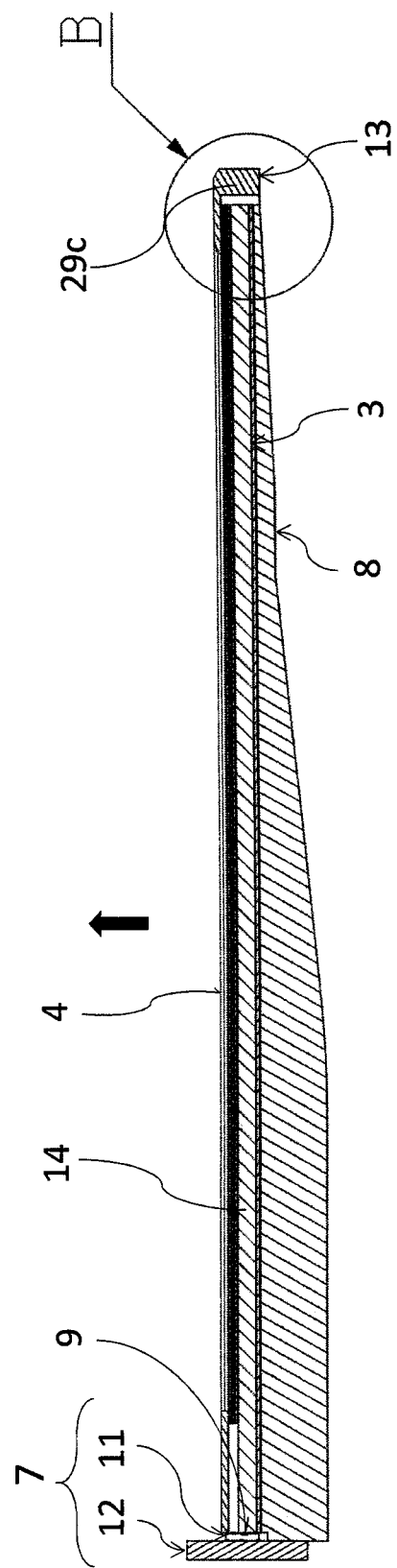
Figure 6:
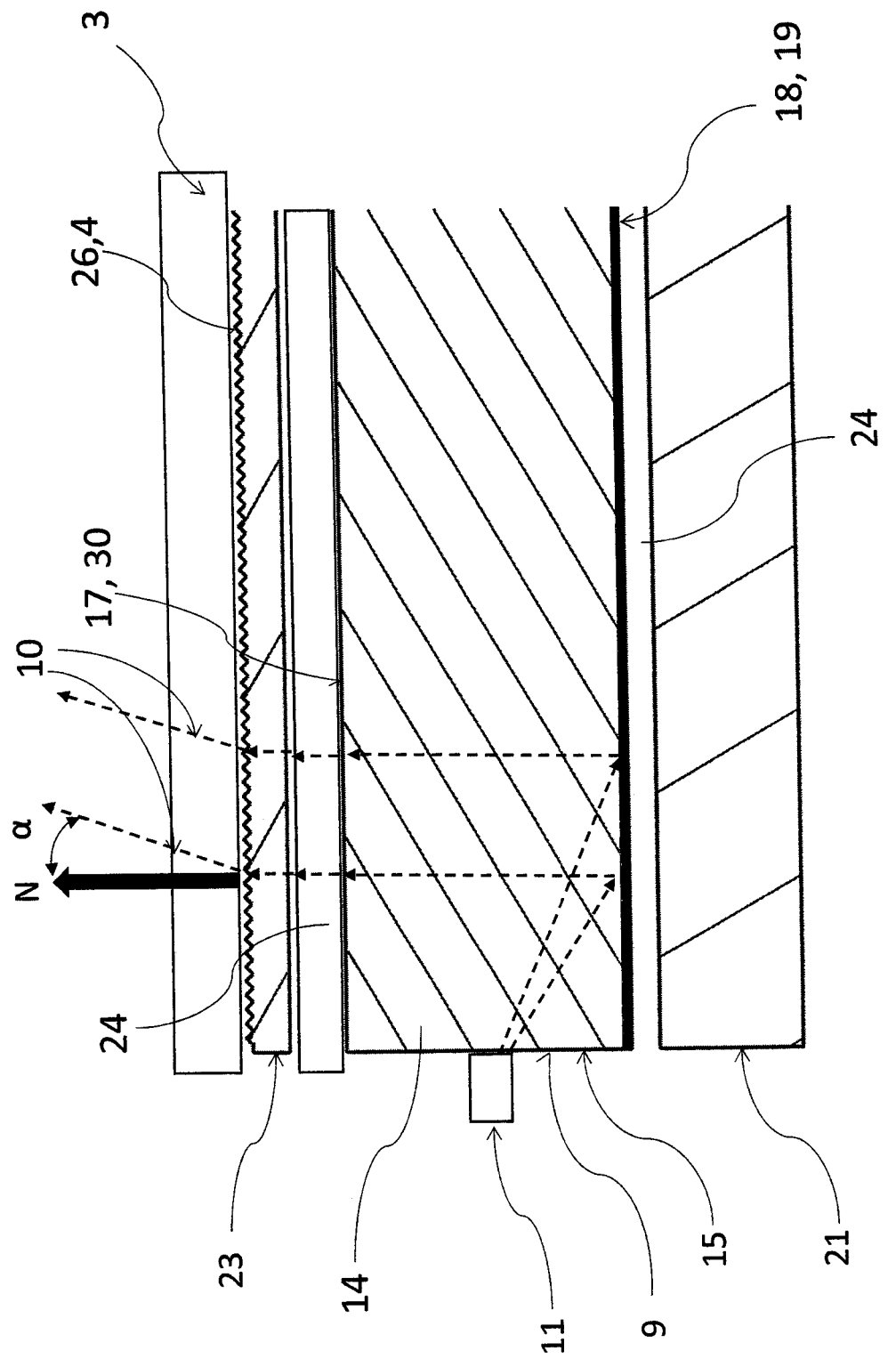
Figure 7:
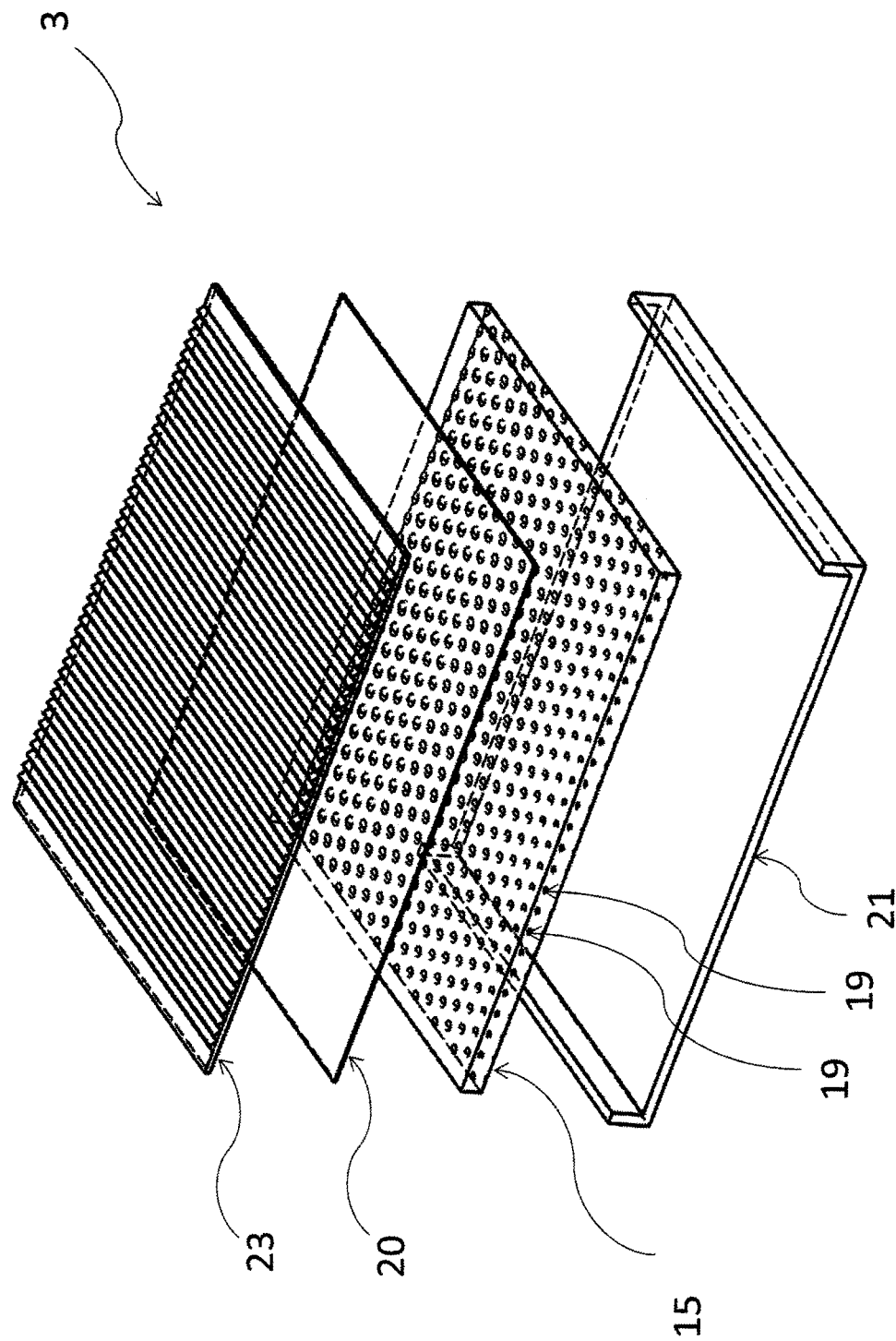
Figure 8:
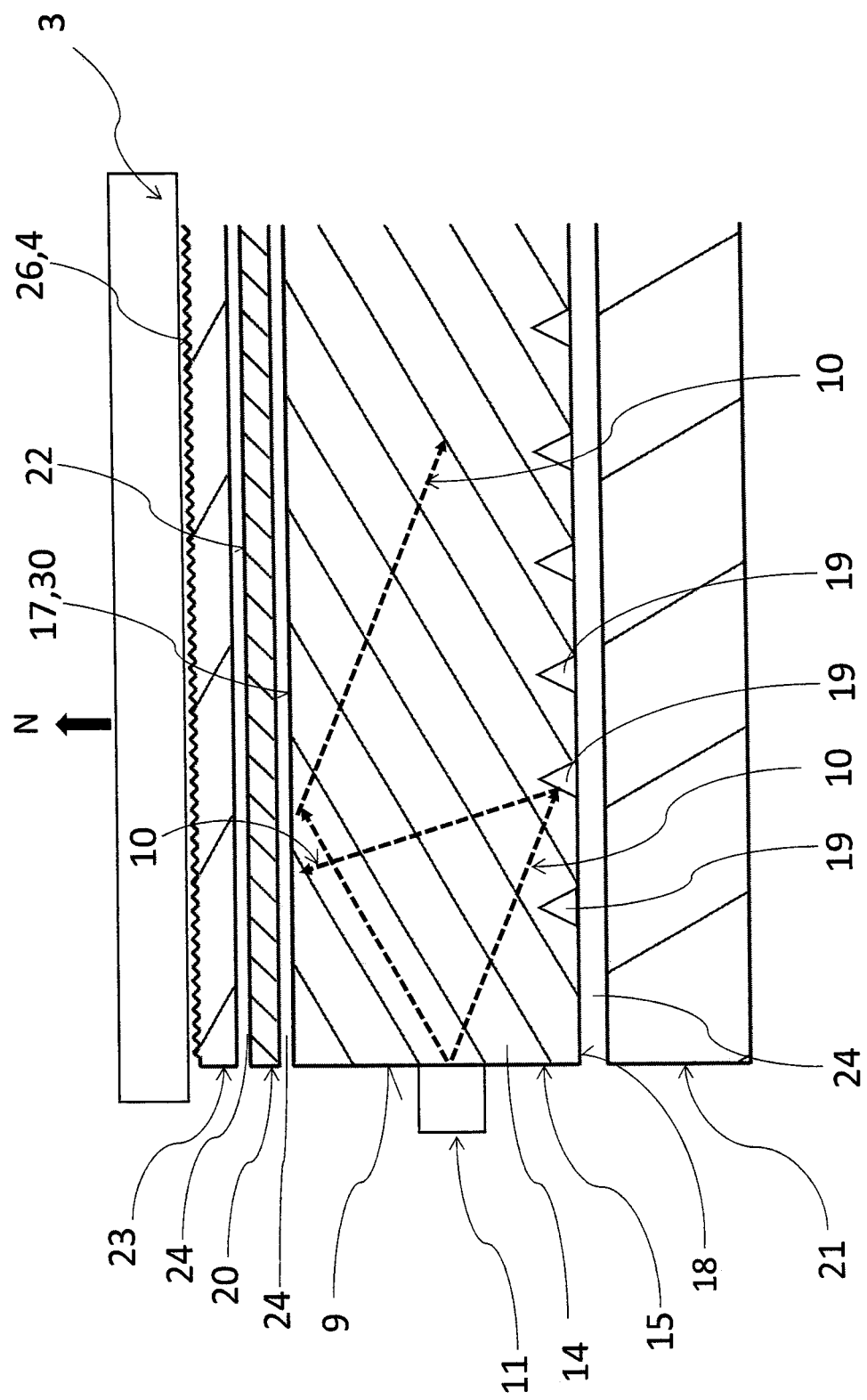
Figure 11:
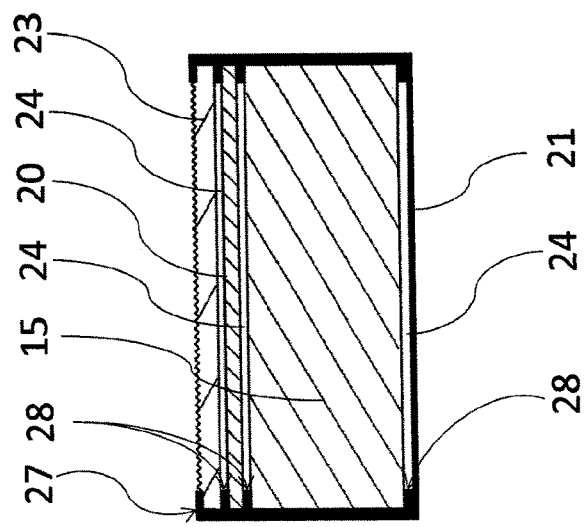
Figure 10:
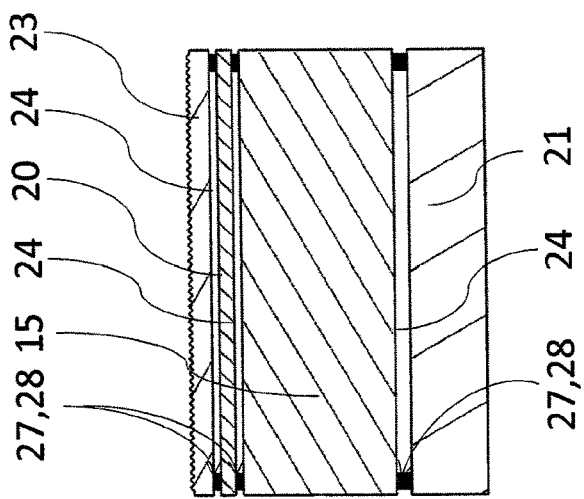
Figure 9:
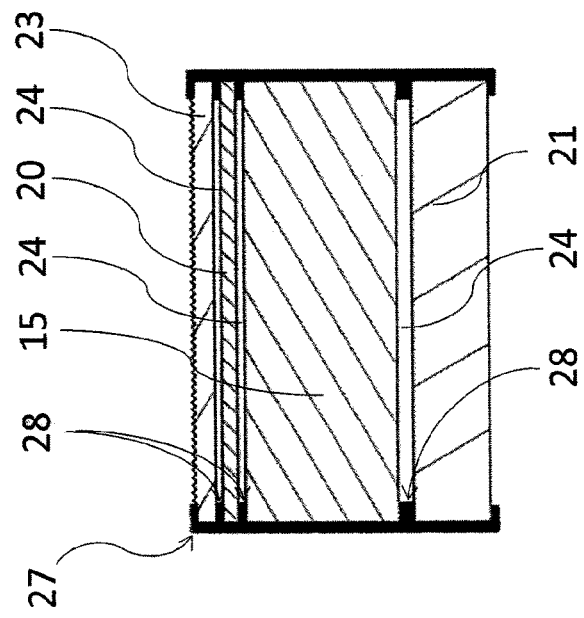
Figure 12:
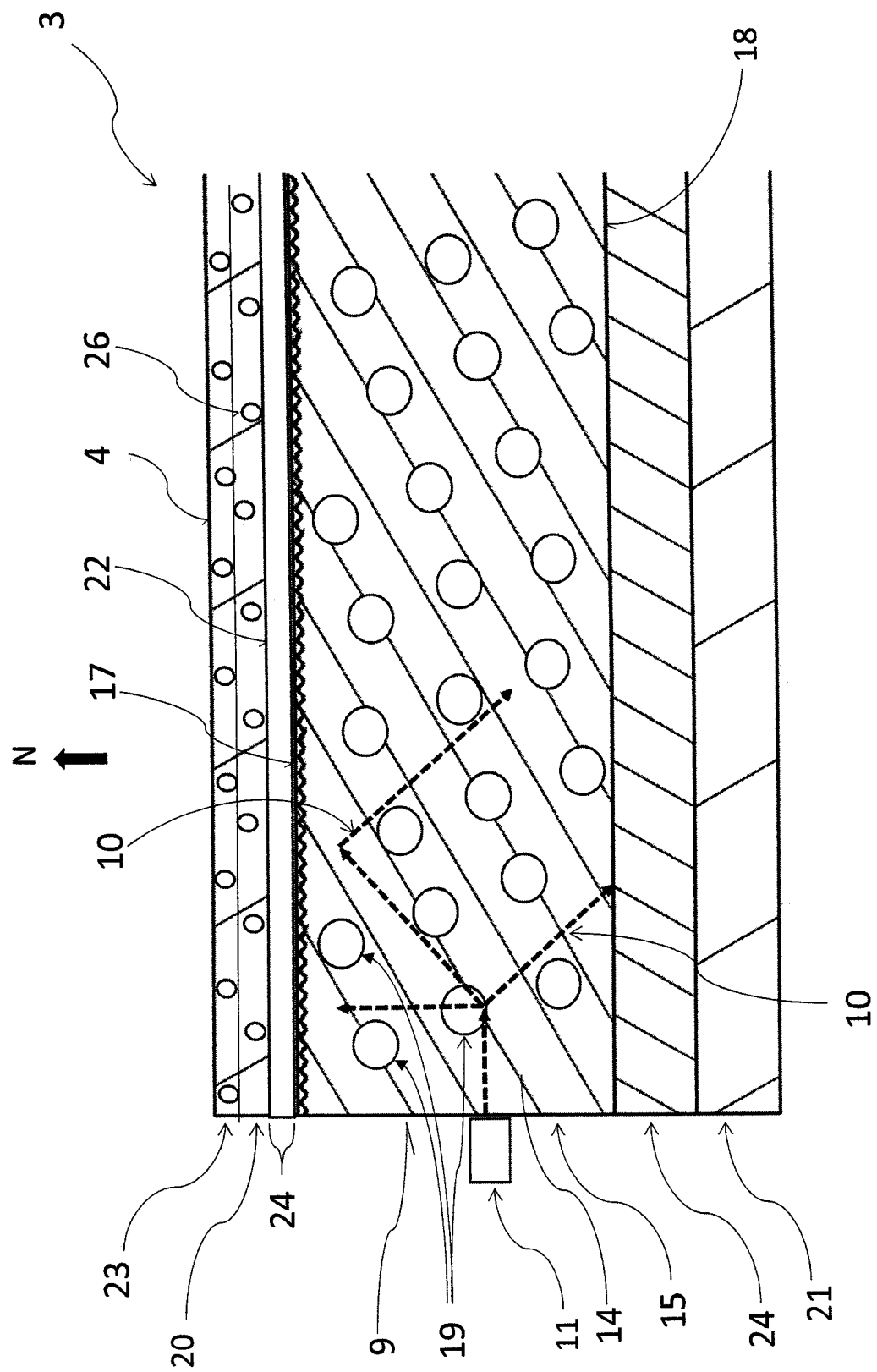
Figure 13:
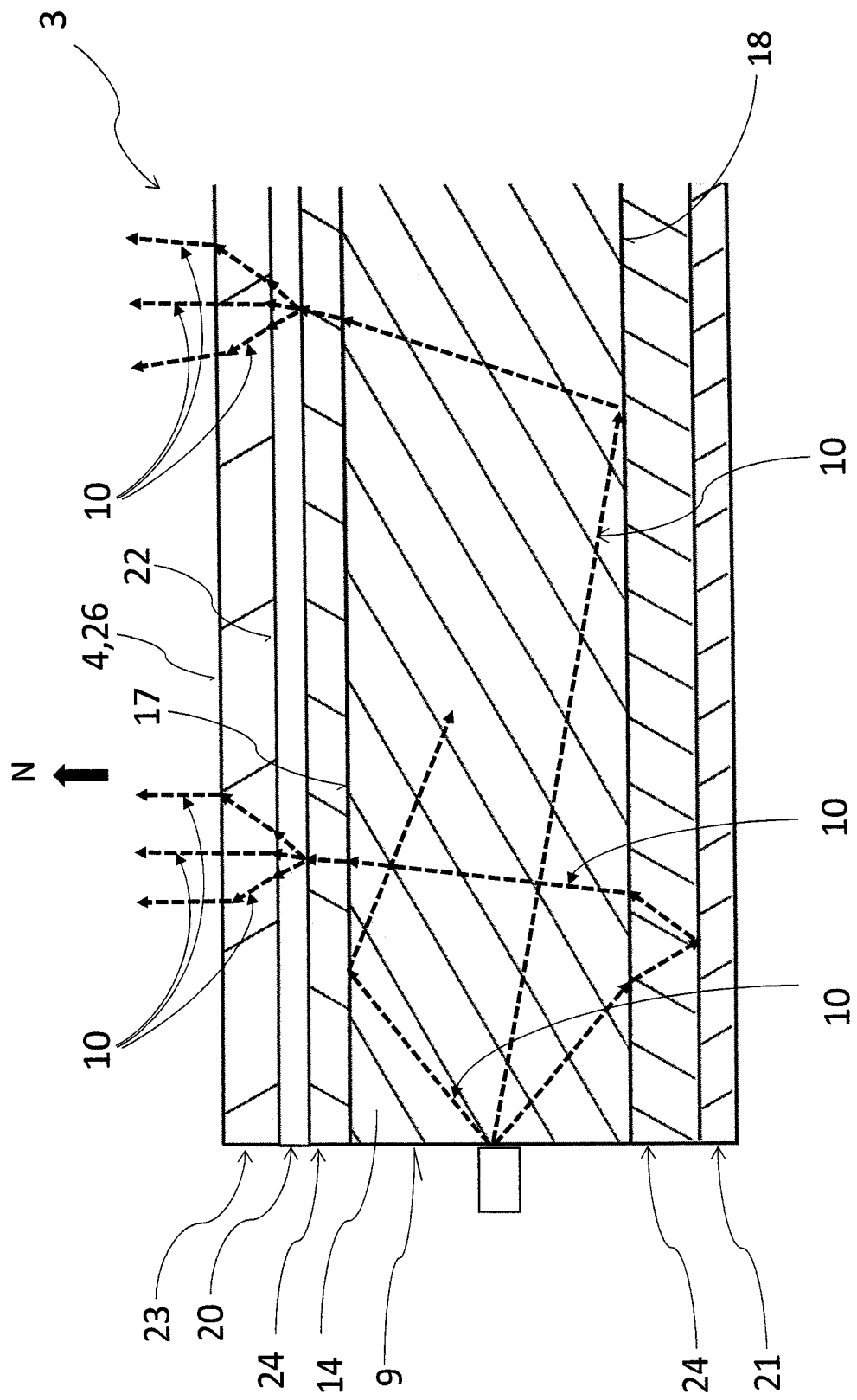
Figure 14:
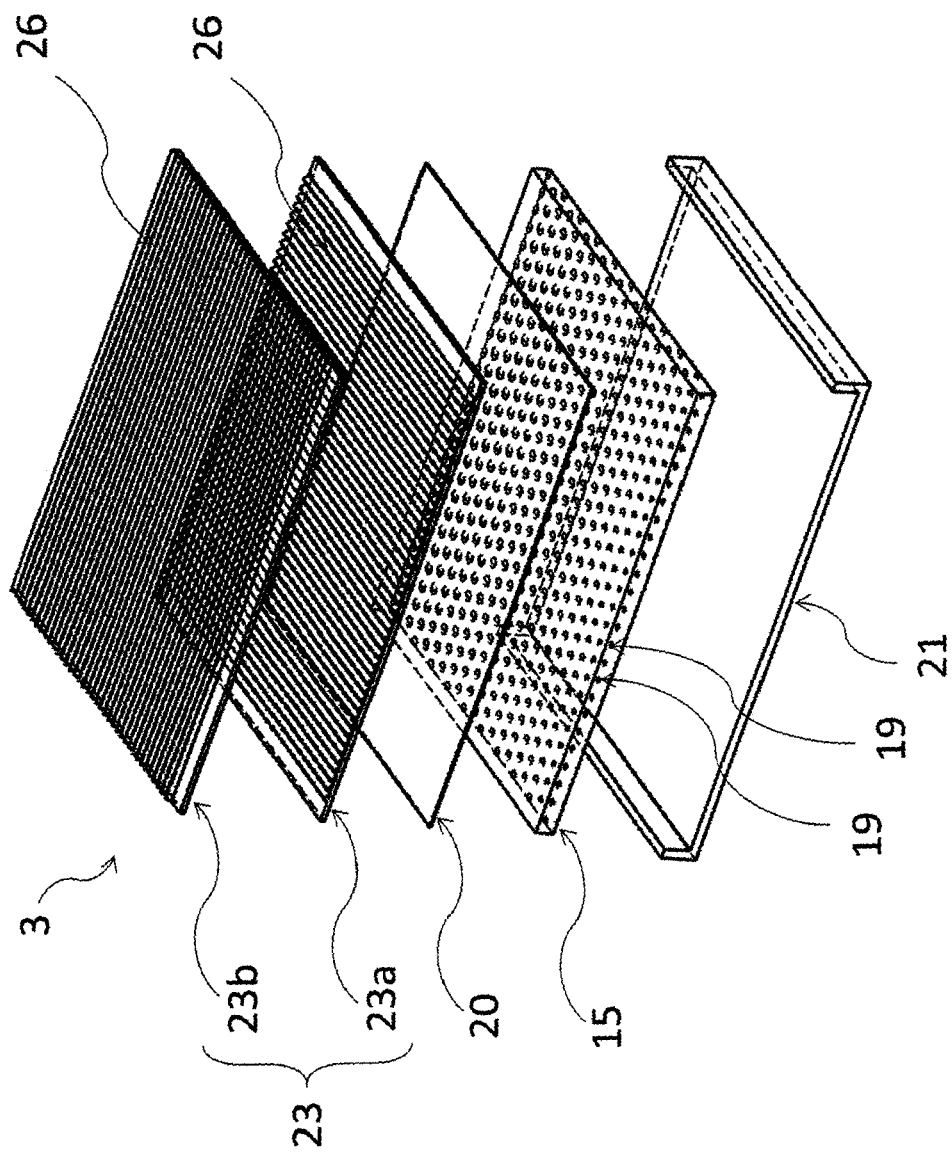
Figure 15:
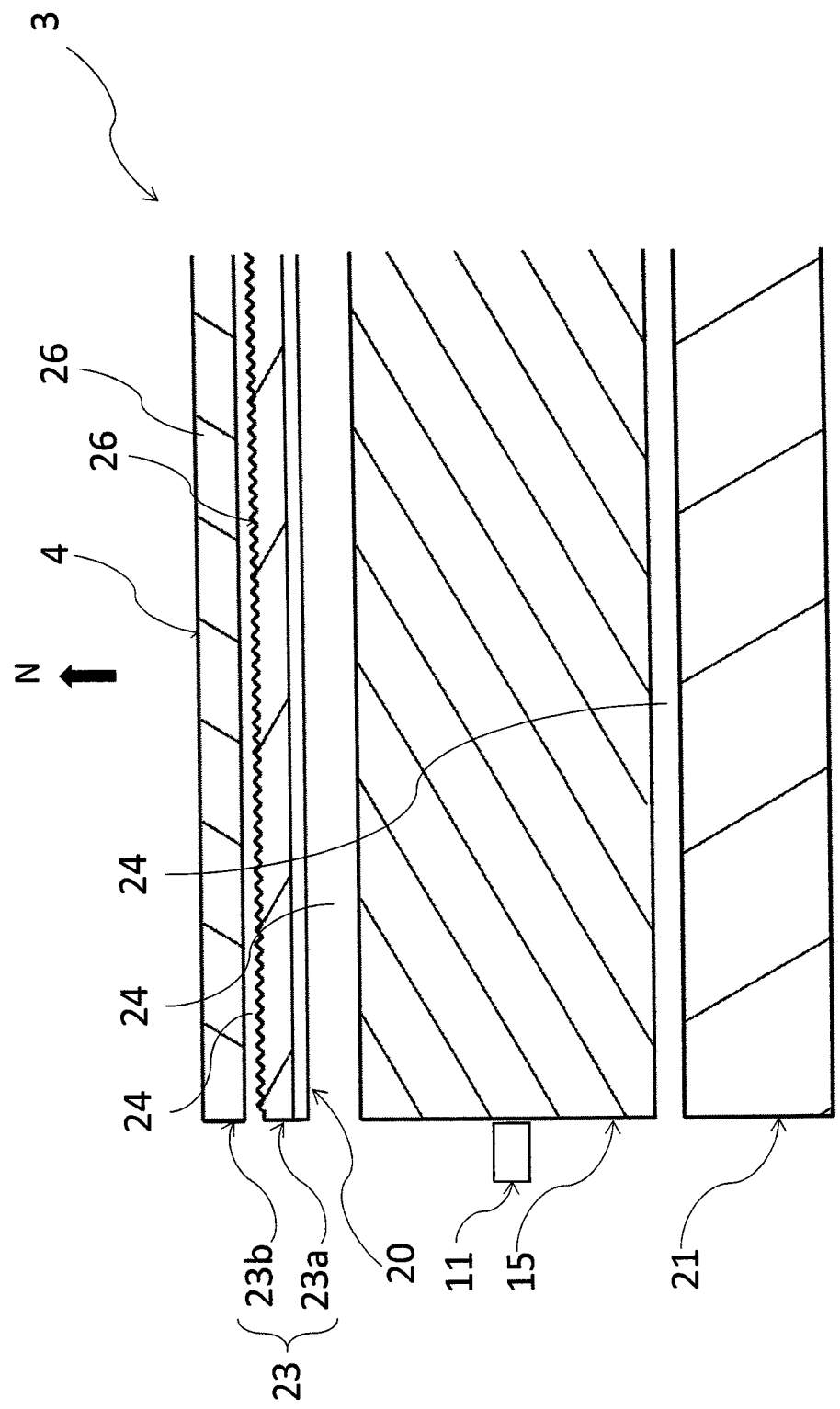
Figure 16:
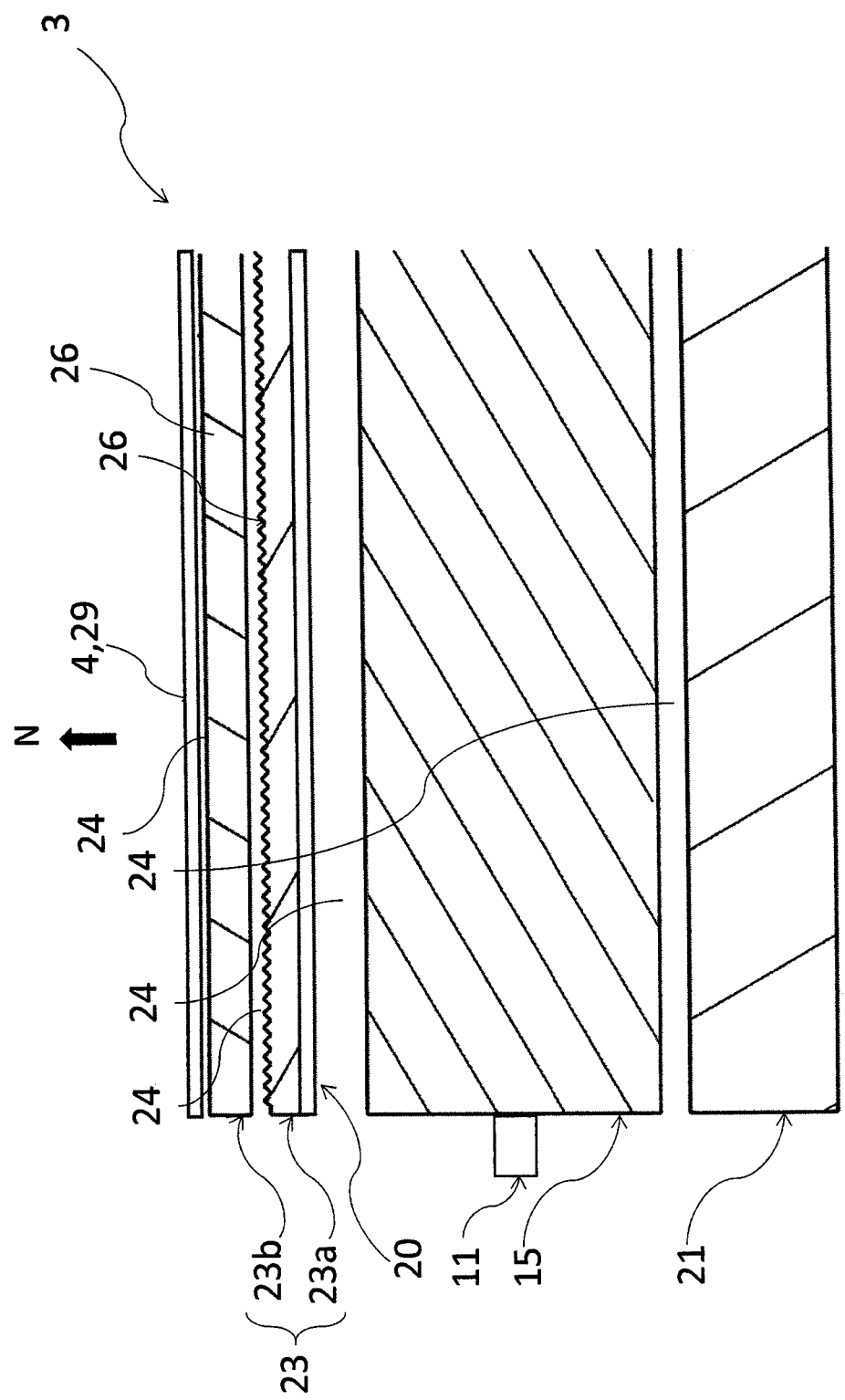
Figure 17:
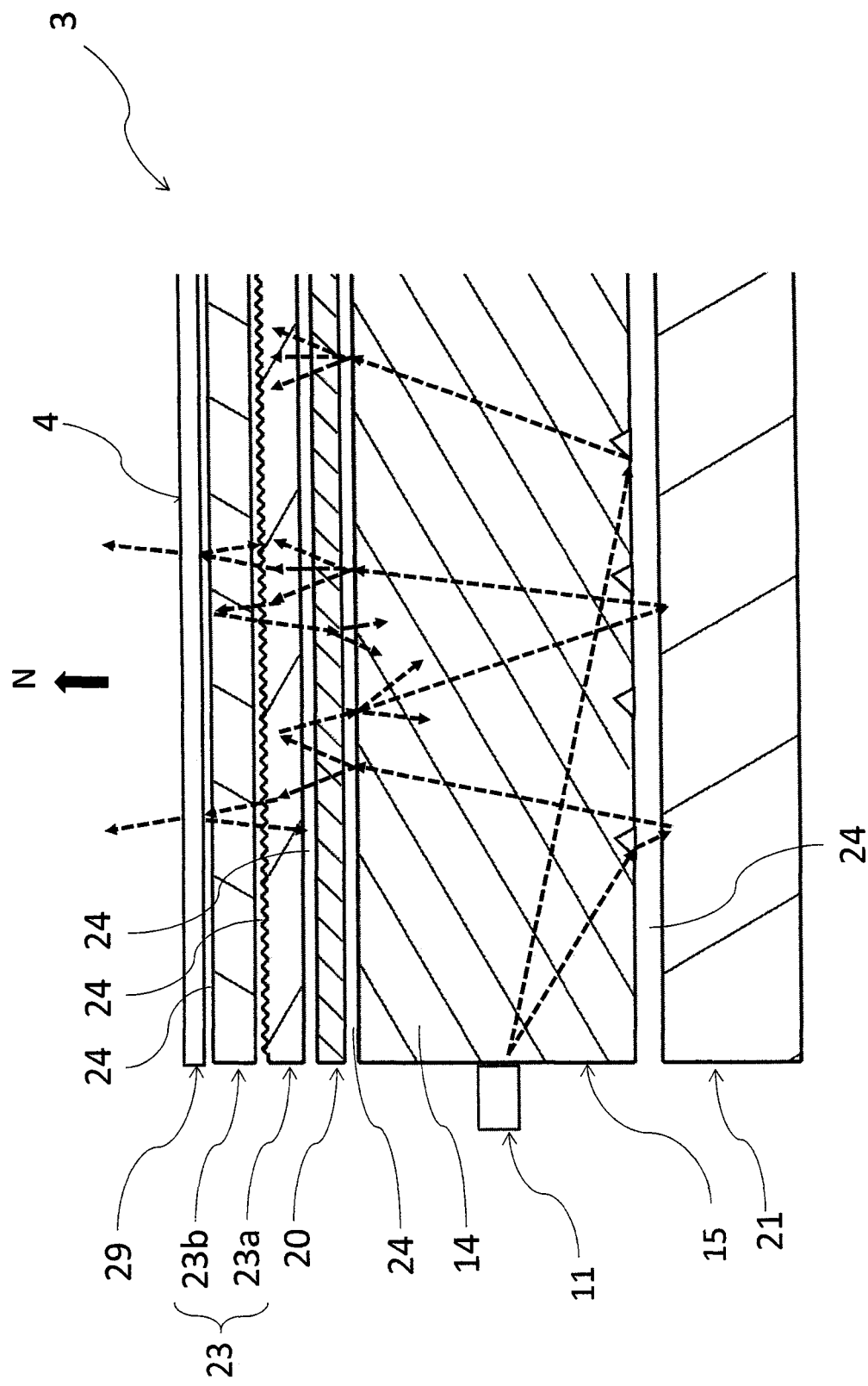
Figure 21:
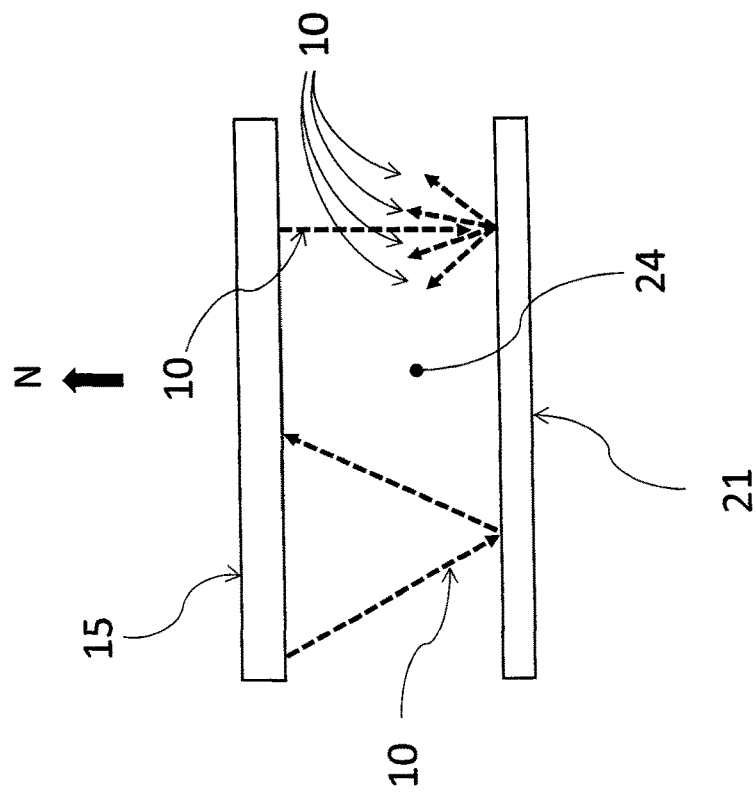
Figure 24:
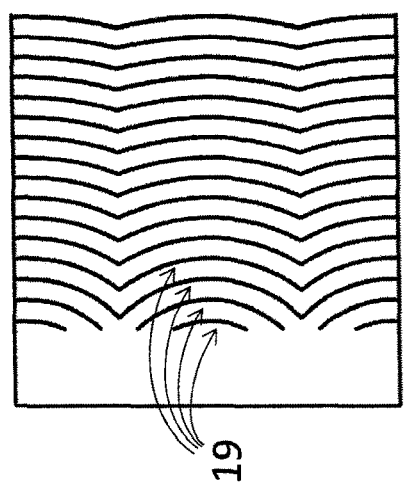
Figure 23:
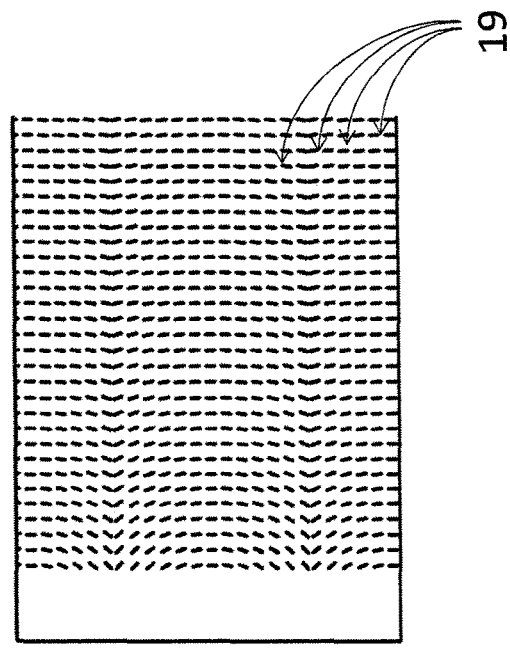
Figure 22:
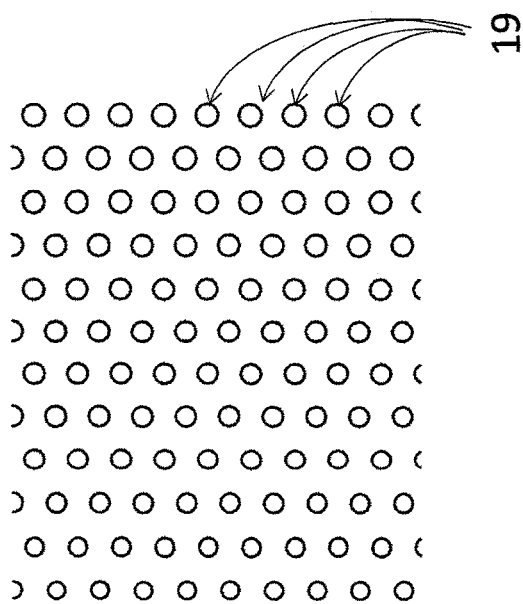
Figure 26:
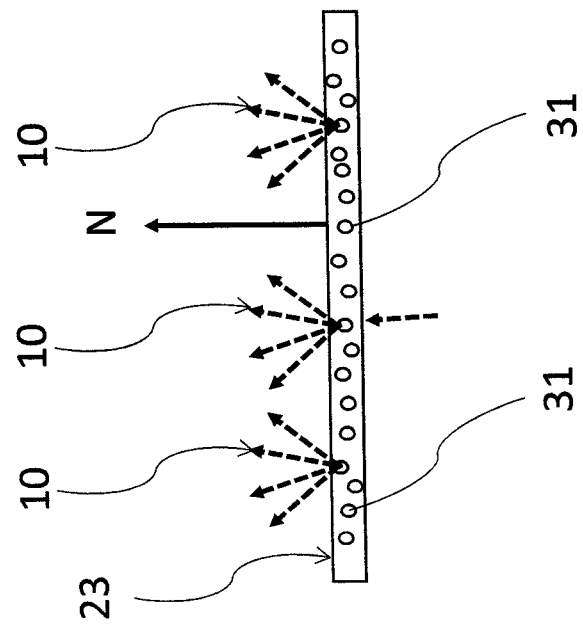
Figure 25:
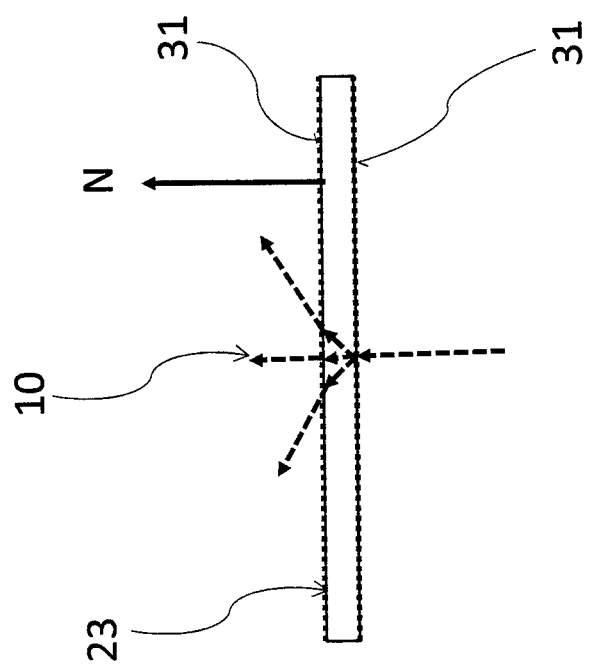
Figure 28:
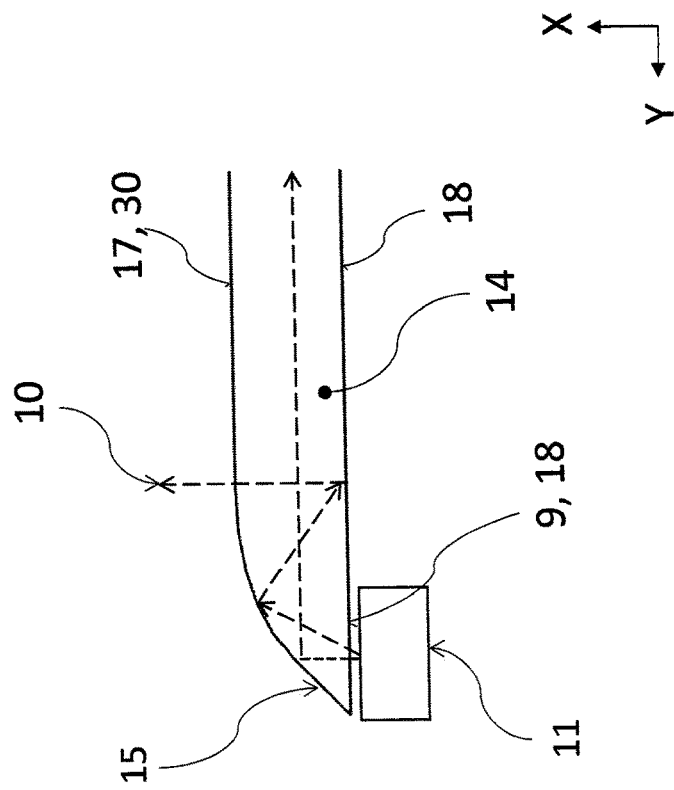
Figure 27:
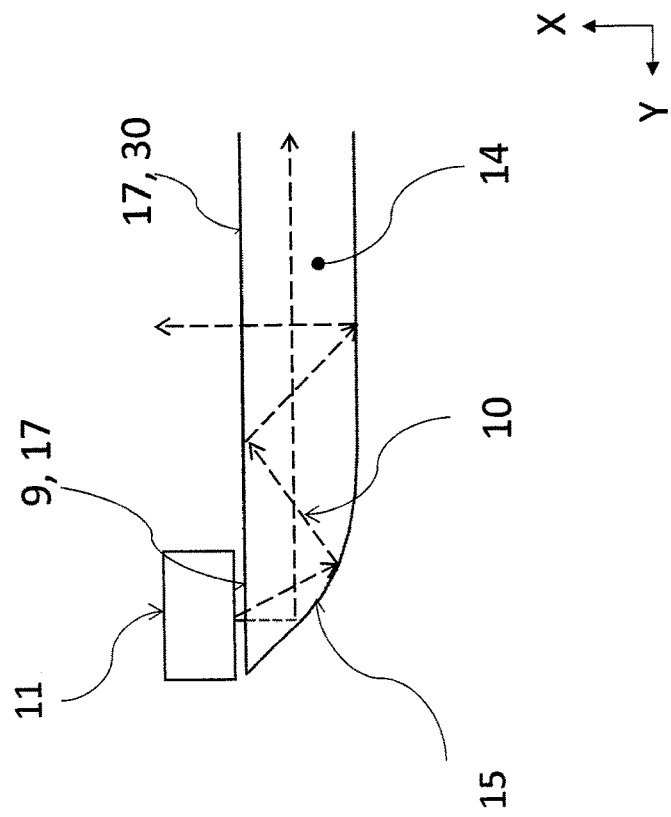
Figure 29:
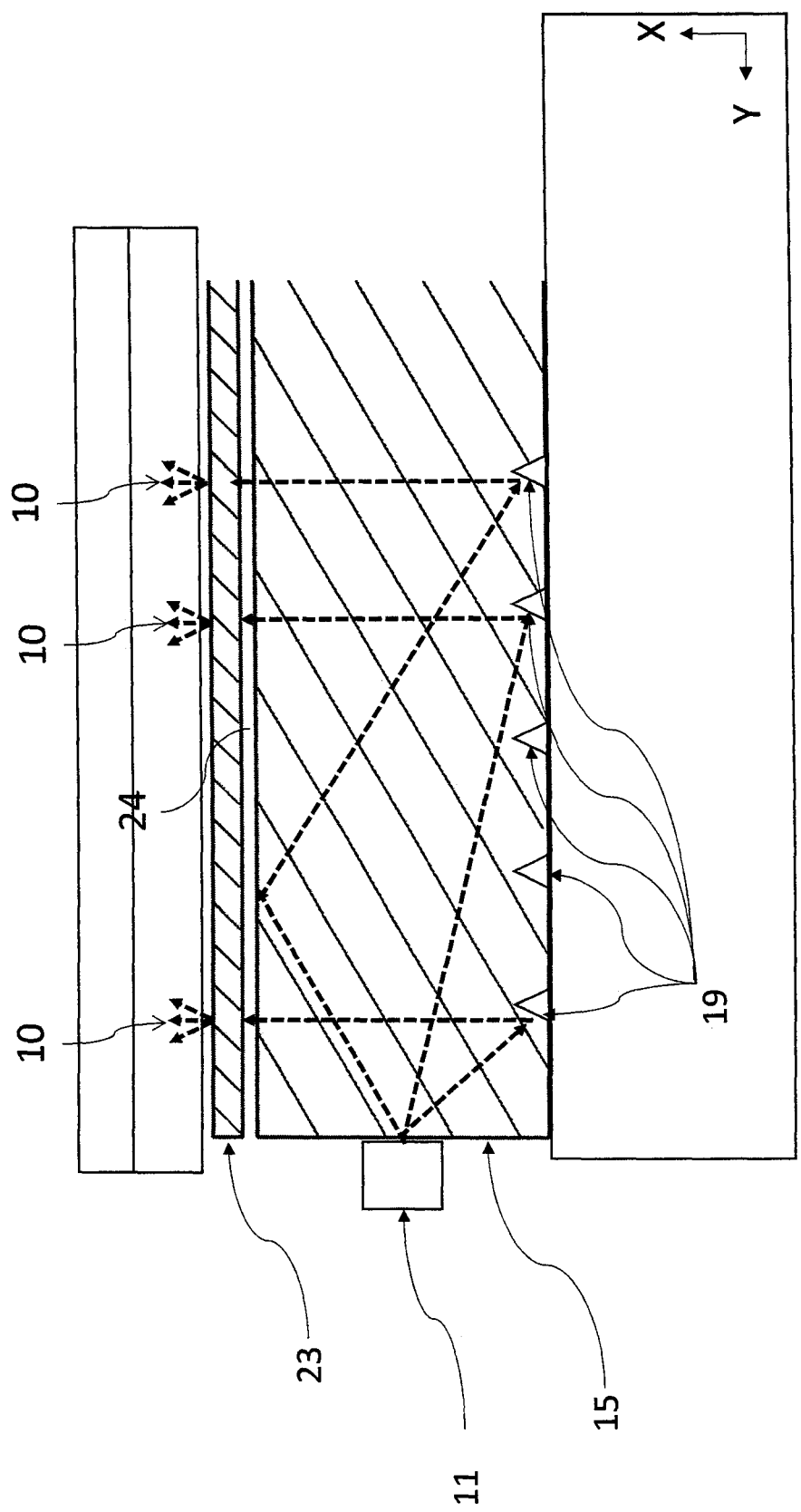
Figure 30:
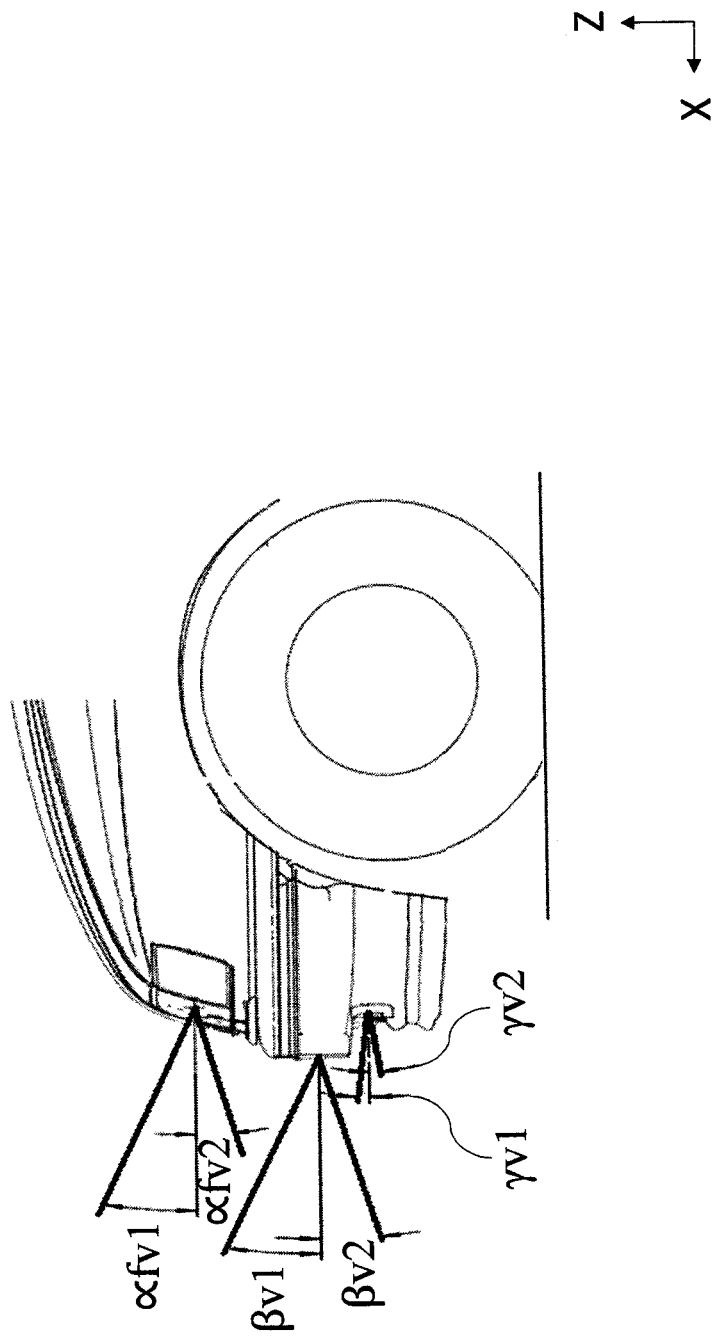
Figure 31:
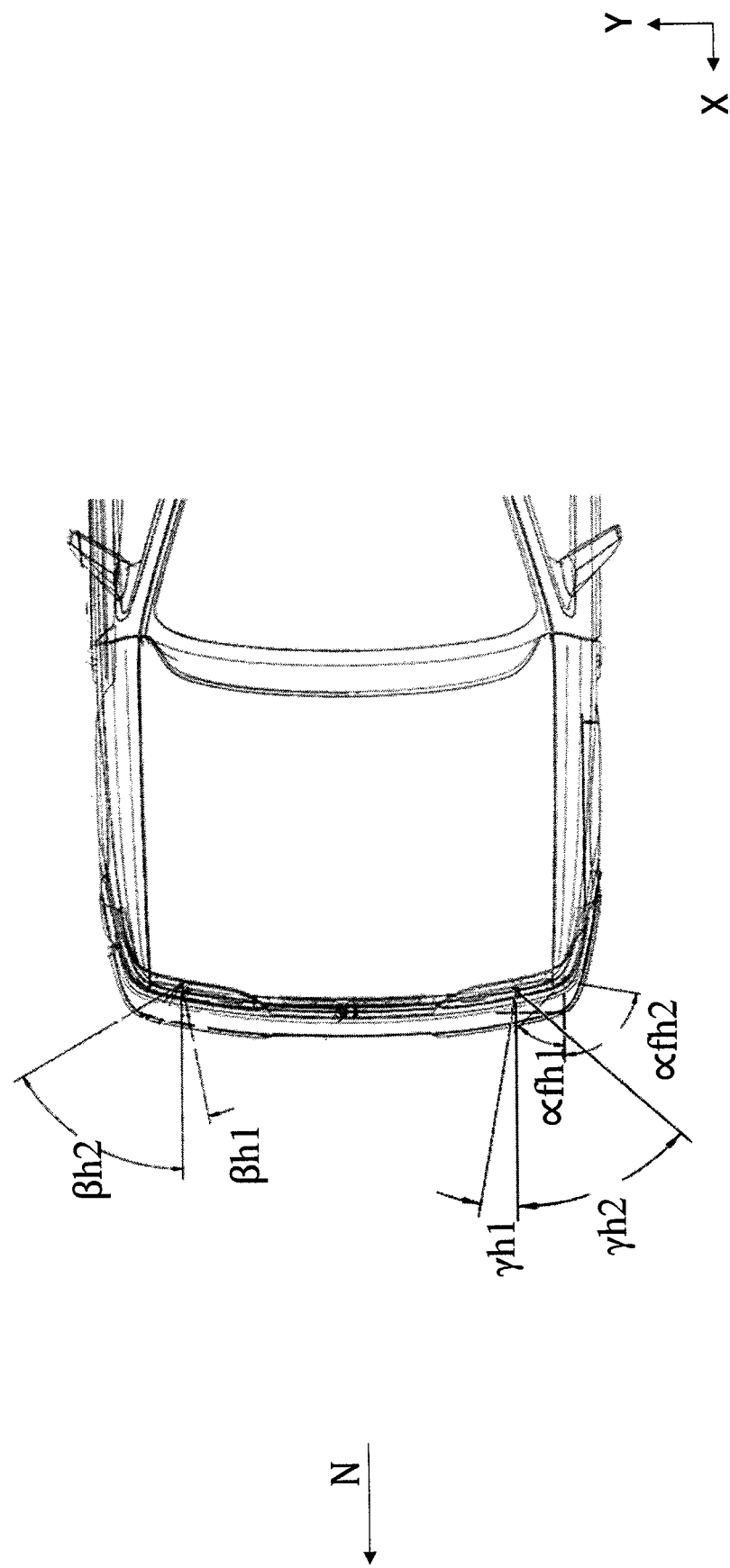
Figure 32:
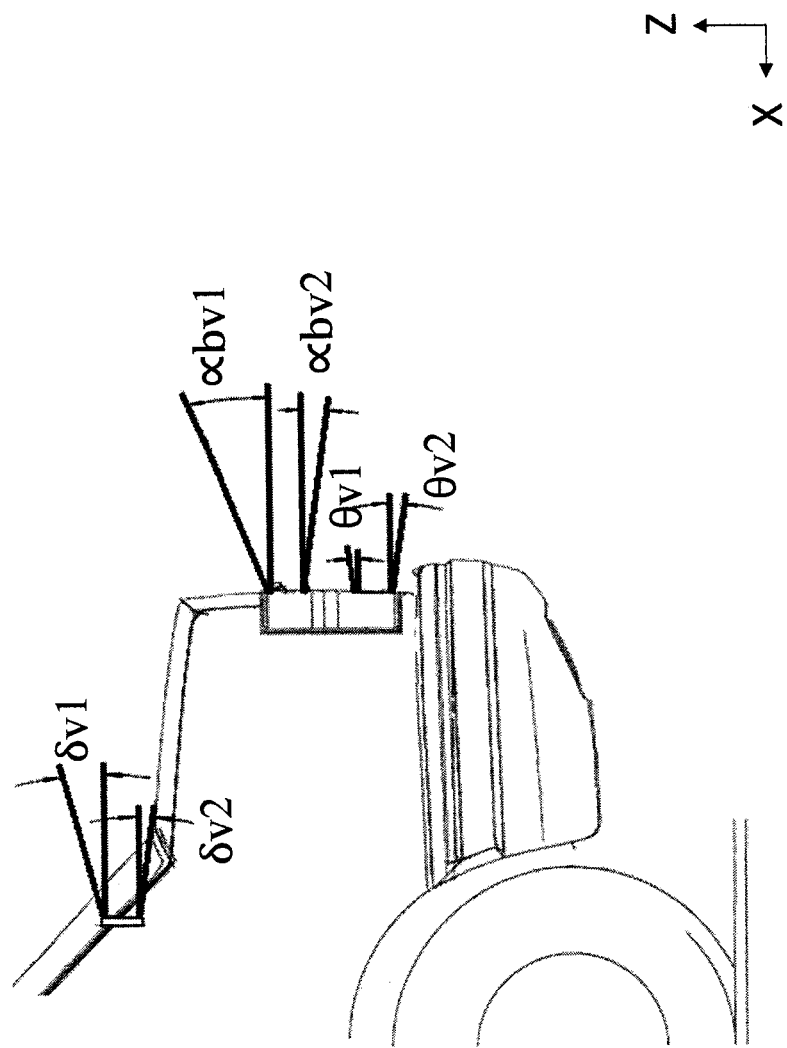
Figure 33:
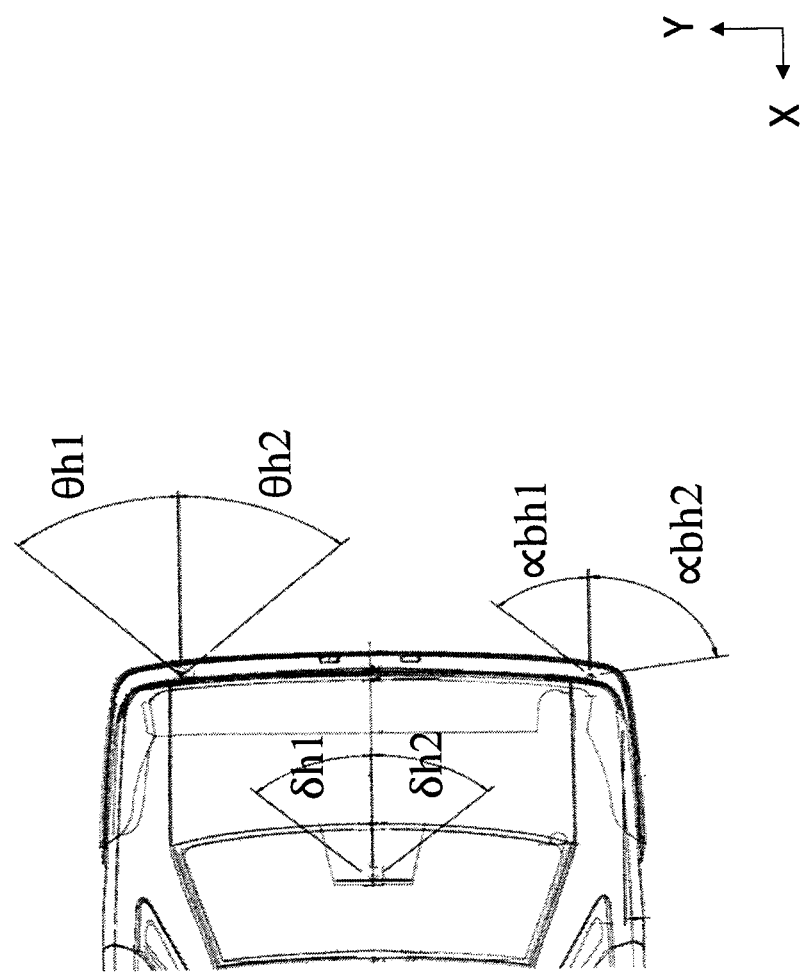
Figure 34:
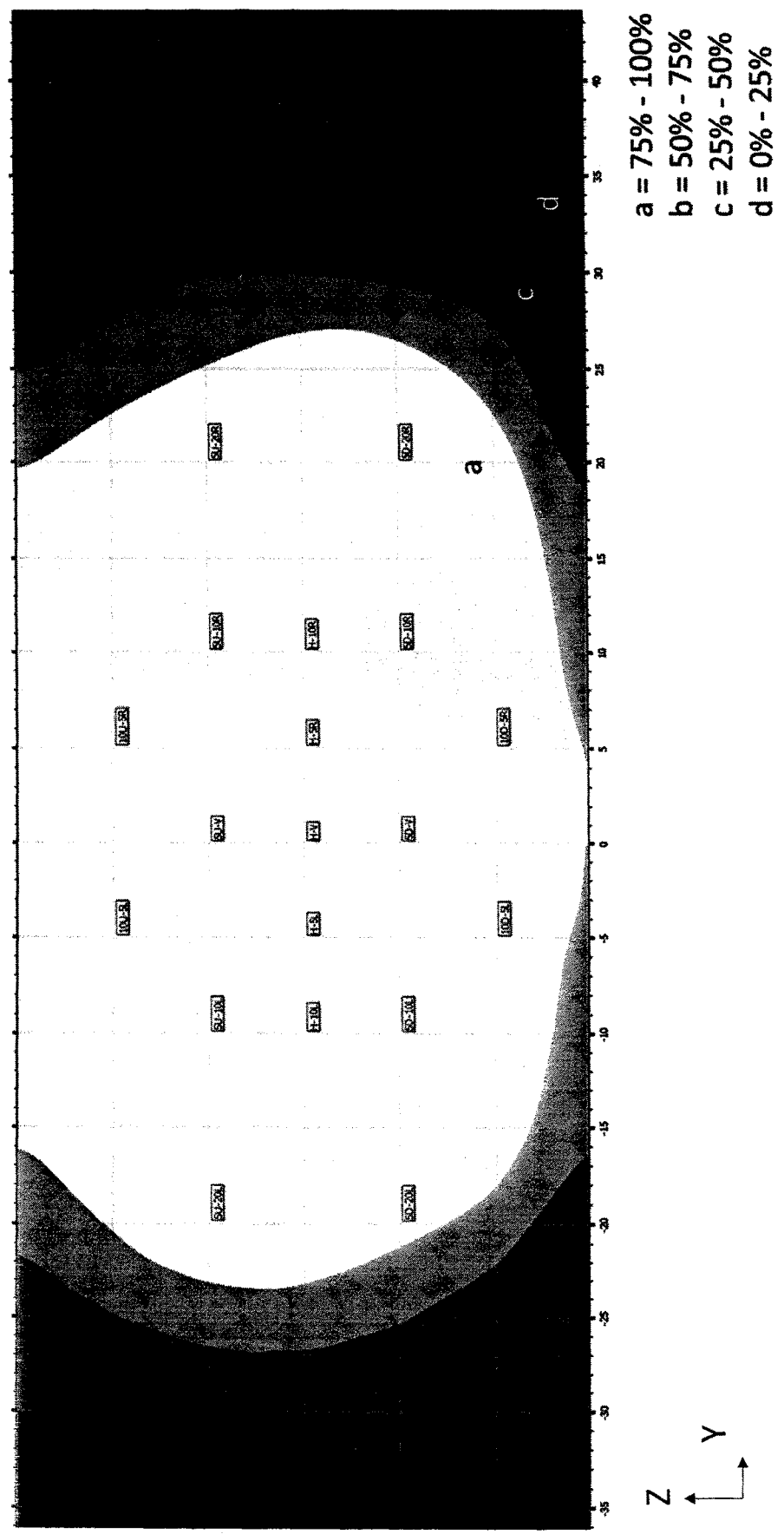
Figure 35:
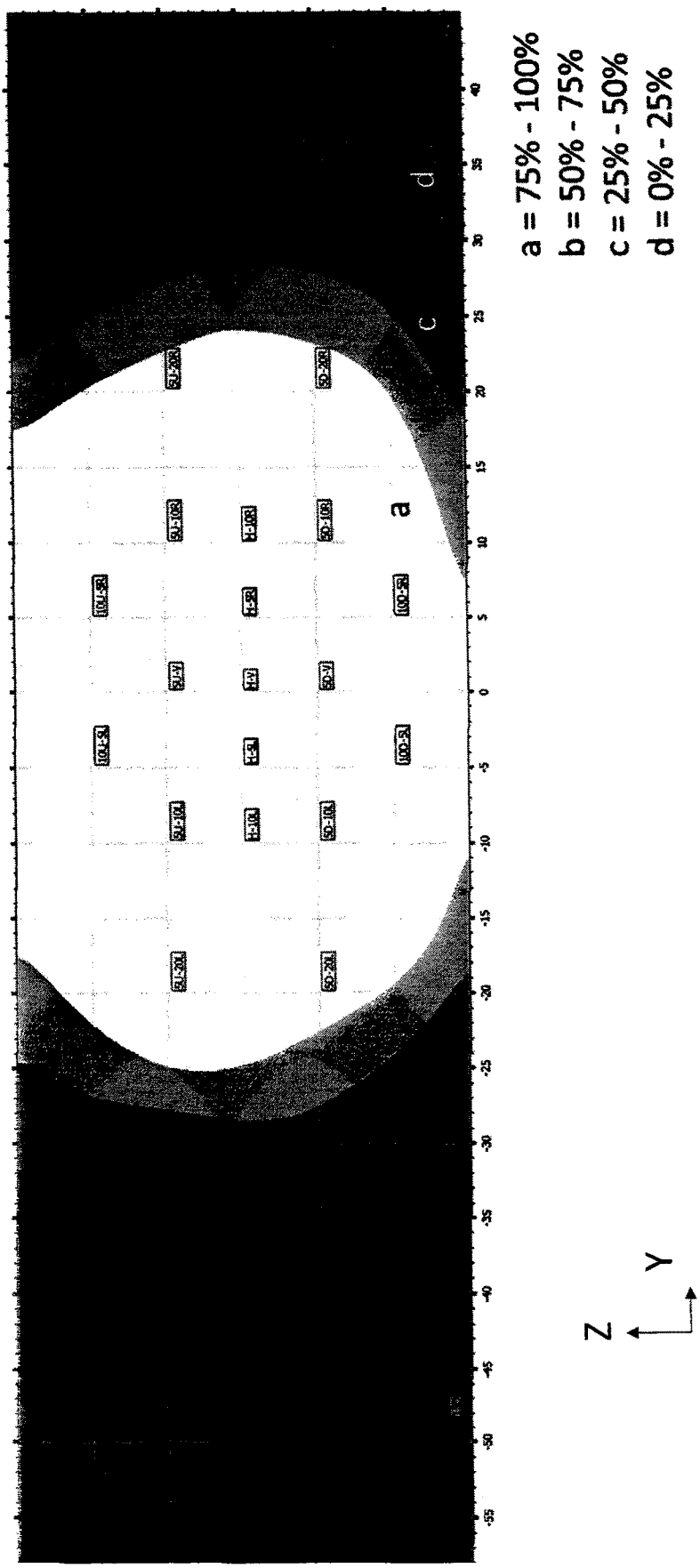
Figure 40:
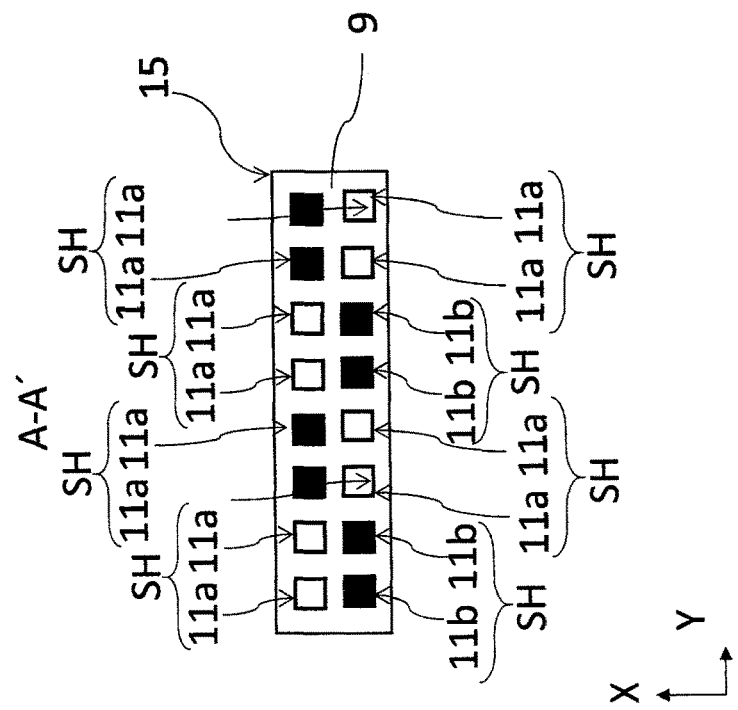
Figure 41:
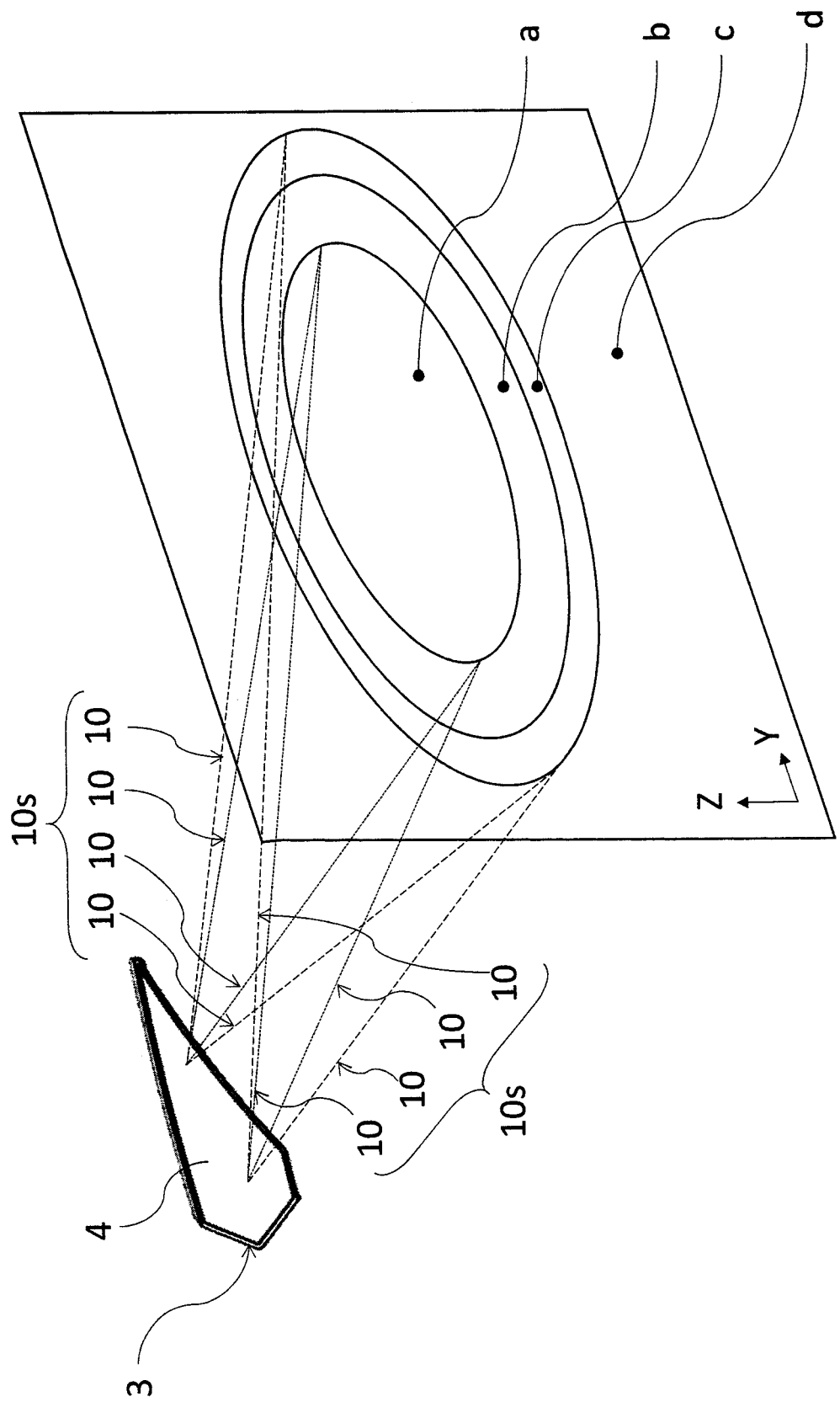
Figure 42:
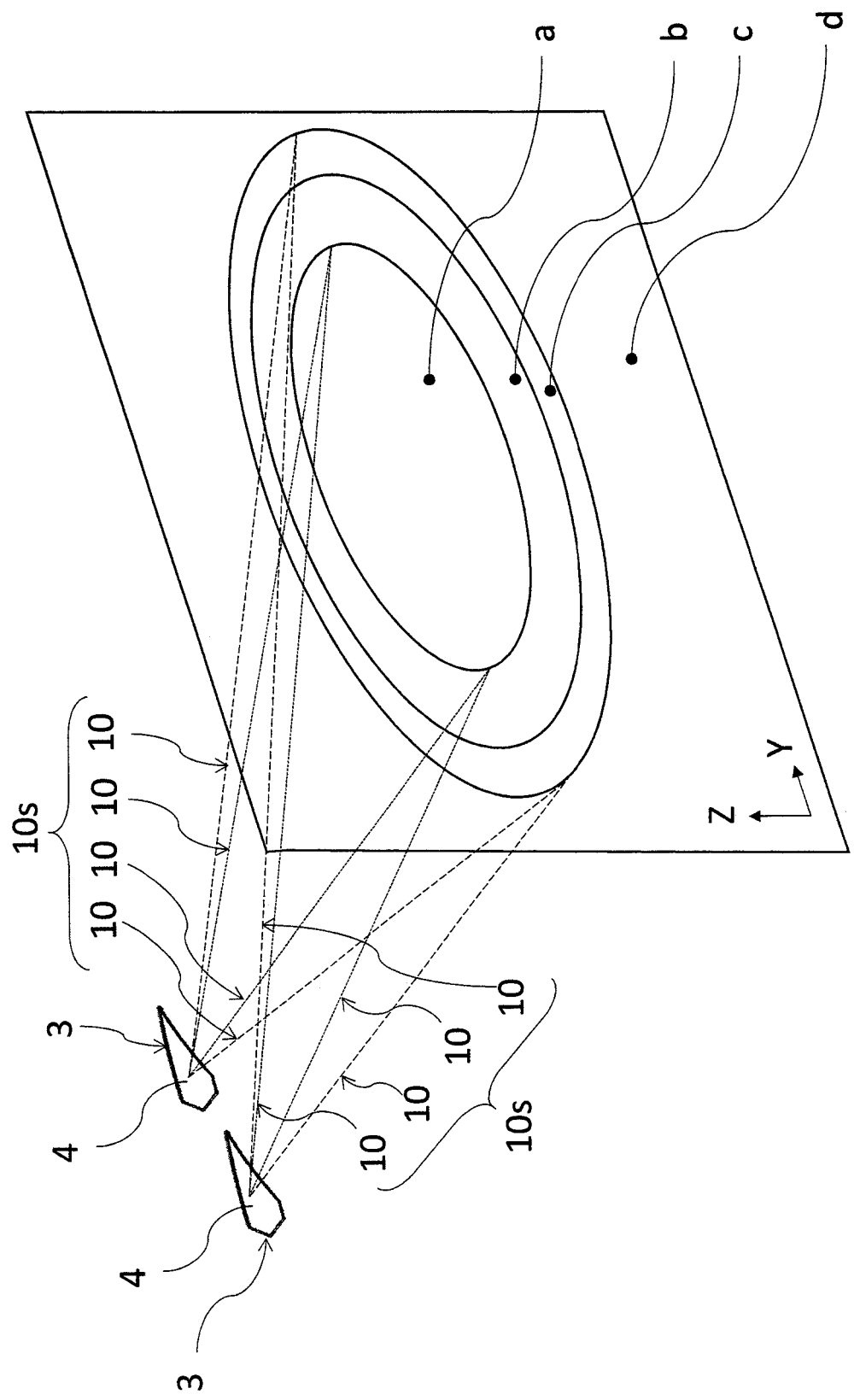
Figure 49:
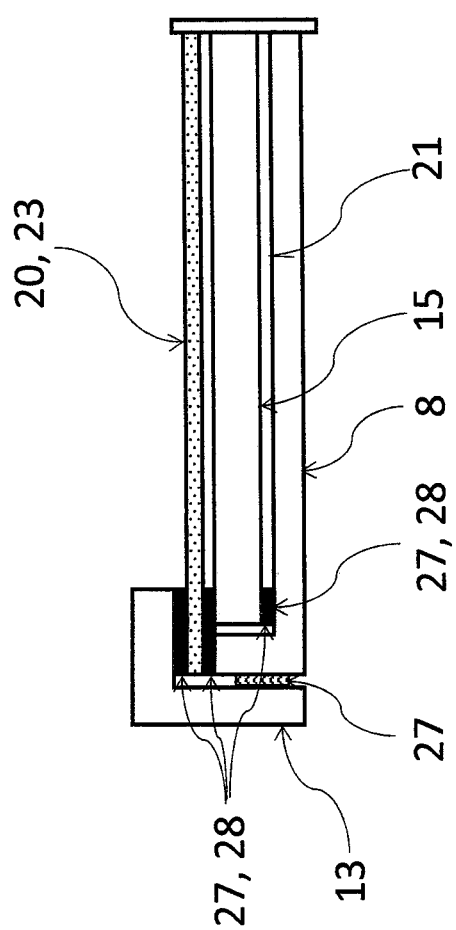
Figure 50:
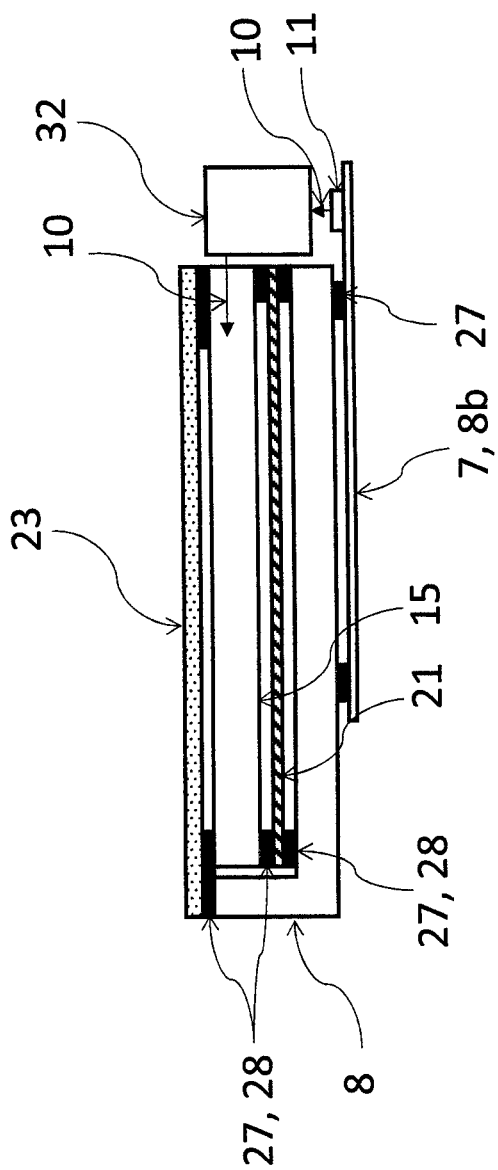
Figure 51:
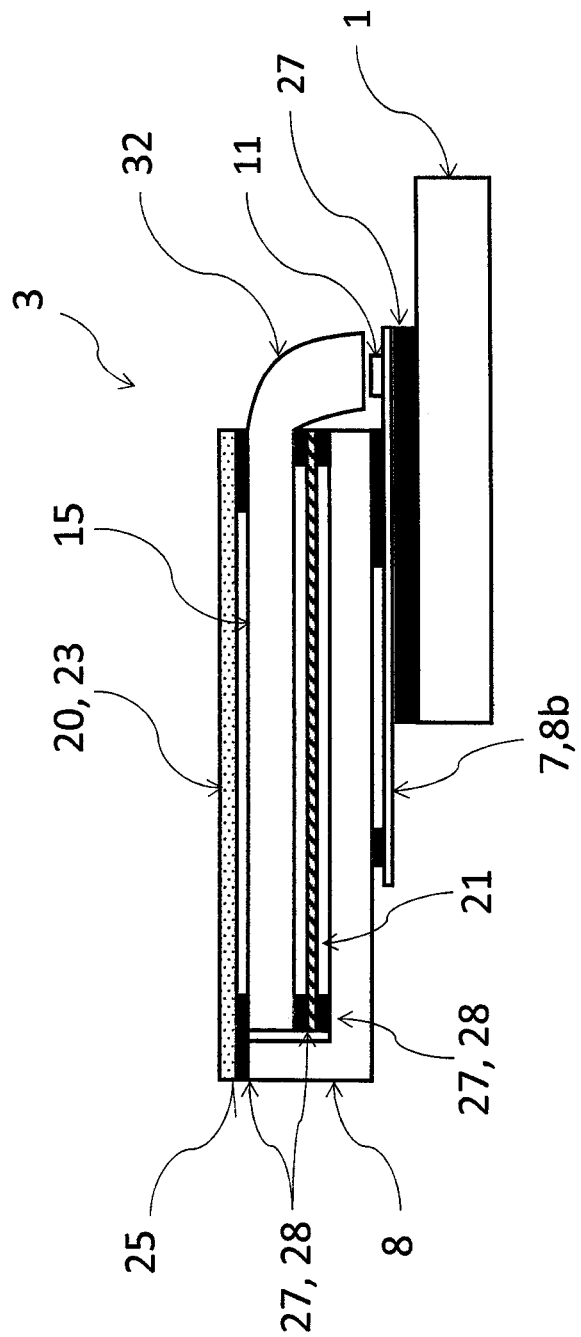
Figure 53:
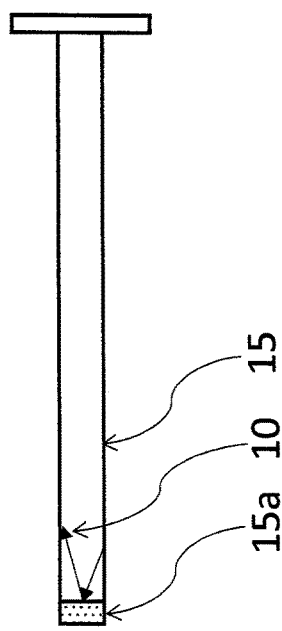
Figure 52:
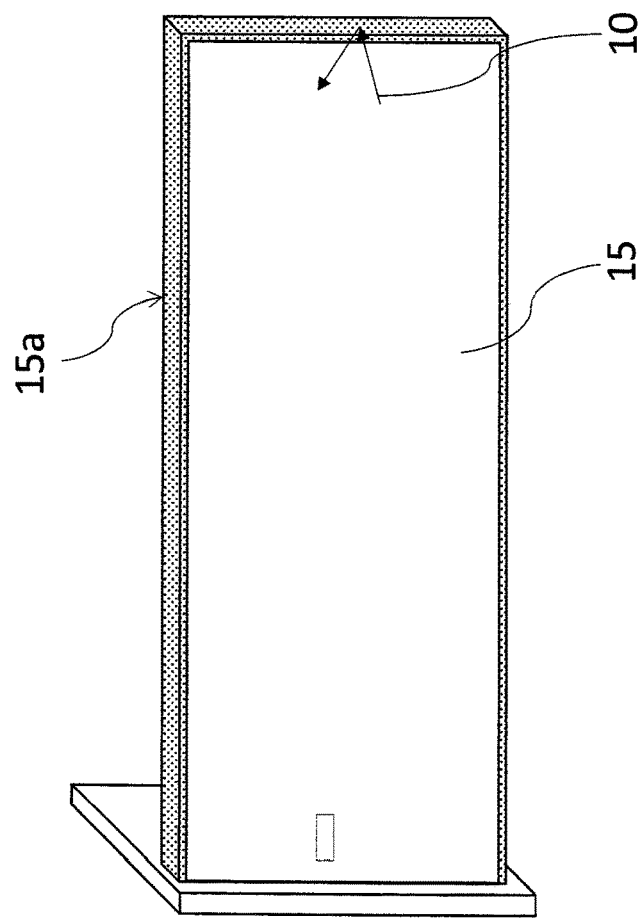

The present invention will be further clarified in more detail with the use of its embodiment examples referring to the enclosed drawings wherein:

FIG. 1 shows a front view of an embodiment example of the motor vehicle light device according to the invention, FIG. 2 shows a front view of another embodiment example of the motor vehicle light device according to the invention, FIG. 3 shows a front view of another embodiment example of the motor vehicle light device according to the invention, FIG. 4 shows a front view of an embodiment example of the lighting unit according to the invention fitted with a covering mask, FIG. 5 shows a front view of the lighting unit with an integral, partly transparent covering mask, FIG. 5b shows a cross-sectional view of the lighting unit of FIG. 5a, FIG. 5c shows a detailed view of the end part of the lighting unit of FIG. 5b, FIG. 5d shows a cross-sectional view of the lighting unit in an alternative embodiment, FIG. 5e shows a detailed view of the end part of the lighting unit of FIG. 5d, FIG. 6 shows a side view of an embodiment example of the lighting unit according to the invention, FIG. 7 shows a perspective view of another embodiment example of the lighting unit according to the invention in a disassembled condition, FIG. 8 shows a side view of another embodiment example of the lighting unit according to the invention, FIGS. 9 to 11 show side views of more embodiment examples of the lighting unit according to the invention, comprising clamping elements, FIG. 12 shows a side view of another embodiment example of the lighting unit according to the invention, FIG. 13 shows a side view of another embodiment example of the lighting unit according to the invention, FIG. 14 shows a perspective view of another embodiment example of the lighting unit according to the invention in a disassembled condition, FIG. 15 shows a side view of another embodiment example of the lighting unit according to the invention, FIG. 16 shows a side view of another embodiment example of the lighting unit according to the invention, FIG. 17 shows a side view of another embodiment example of the lighting unit according to the invention with a schematic representation of the route of light rays, FIGS. 18 to 21 schematically show side views of the route of light rays between the individual planarly shaped parts of the lighting unit, FIGS. 22 to 24 show embodiment examples of unbinding elements, FIGS. 25 and 26 show embodiment examples of the functional layer, FIGS. 27 and 28 show examples of the manner of positioning of the light source with respect to the light-conductive core, FIG. 29 shows a side view of another embodiment example of the lighting unit according to the invention with a schematic representation of the route of light rays, FIG. 30 and FIG. 31 schematically show examples of several front signal functions, FIG. 32 and FIG. 33 schematically show examples of several rear signal functions, FIG. 34 shows an example of the angular distribution for the stop function implemented according to the invention, FIG. 35 shows an example of the angular distribution for the tail light function implemented according to the invention, FIGS. 36 to 40 schematically show examples of several arrangements of light sources, FIG. 41 schematically shows an example of implementation of light distribution for a particular light function by means of one lighting unit, FIG. 42 schematically shows an example of implementation of light distribution for a particular light function by means of two lighting units, FIGS. 43, 44, 45 and 46 show other embodiment examples of the lighting unit according to the invention configured for the output of light rays also from the lateral exit surface of one to of the layers included in the lighting unit, FIGS. 47, 48, 49, 50 shows other embodiment examples of the covering mask of the lighting unit according to the invention, FIG. 51 schematically shows an example of implementation of the seating of the lighting unit on the carrier housing, and FIGS. 52 and 53 schematically show an example of implementation of the outer edge of the light-conductive core.

EXAMPLES OF EMBODIMENTS OF THE INVENTION

For the purposes of this invention, the terms "top" and "bottom" used in the disclosure and claims with individual parts correspond to the location of these parts in FIGS. 5 to 29, i.e. considering the lighting unit 3 placed in a flat-lying position in such a way that its active area 4, i.e. the area that light rays exit from towards the translucent cover out of the lighting unit 3, is at the top. Naturally, the said position of the lighting unit 3 does not refer to the position in which the lighting unit 3 is mounted during the operation of the vehicle in the light device.

FIG. 1 shows an embodiment example of the motor vehicle light device according to the invention comprising a carrier housing 1 covered by a translucent cover and an inner chamber 2 wherein a planarly shaped lighting unit 3 is mounted, comprising an active area 4 on its surface.

FIG. 2 shows another embodiment example of the motor vehicle light device according to the invention wherein the inner chamber 2 contains a system 5 of lighting units 3 to create an assembly 6 of active areas 4 adapted to produce at least one light trace with the required light characteristic.

FIG. 3 shows another embodiment example of the motor vehicle light device according to the invention wherein each lighting unit 3 comprises two active areas 4 to create two different assemblies 6 of active areas 4 to emit different light traces with a different light characteristic.

FIGS. 4 to 42 describe several embodiment examples of the lighting unit 3 according to the invention.

Referring to the embodiment example shown in FIGS. 4, 5a to 5e, the lighting unit 3 comprises a light-conductive core 15 made of an optically transparent material with an associated light unit 7, which is situated at the lateral entry area 9 of the light-conductive core 15 to emit light rays 10 to the body 14 of the light-conductive core 15. The light-conductive core 15 comprises on its top surface 17 an exit area 30 for the output of here not shown light rays 10 conducted through the body 14 out of the light-conductive core 15. The lighting unit 7 is, by means of carriers 8 and 8a, positioned at the laterally situated entry area 9 of the light-conductive core 15 and comprises a group of light sources 11. e.g. LED's, mounted on a carrier element 12, e.g. a PCB. At the front side, a covering mask 13 having the shape of a frame is situated before the lighting unit 3, the mask covering the edges of the active area 4 of the lighting unit 3 in the front view. At the bottom side, the lighting unit 3 is mounted on a carrier 8. The covering mask 13 can be designed as a single-component part with a cut-out for the active surface 4 or as a multi-component part with translucent or transparent areas covering the active surface 4 or with cut-outs for the active surface 4. Further, the covering mask 13 can be fitted with a transparent segment 29a, a non-transparent segment 29b or a partly transparent segment 29c wherein individual segments 29a, 29b, 29c are implemented through the surface finish of parts of the covering mask 13 or by multiple injection of plastic into the mold to create several inactive and/or active lighting areas of one active surface 4.

FIG. 5a shows a multi-component design of the covering mask 13 with one lighting transparent segment 29a and one lighting partly transparent segment 29c, which are separated and delimited by non-transparent segments 29b. In the detailed view of FIG. 5c, a homogenizer 20 and two functional layers 23 are situated over the light conductive core 15. Under the light-conductive core 15, a reflector 21 and a carrier 8 is situated. In a preferred embodiment, the carrier 8 can be made of a material suitable for reflection of light rays and/or it is at least partly fitted with surface finish suitable for reflection of light and thus it can fulfill the function of a reflector 21 at the same time.

As shown in FIGS. 5d and 5e, the covering mask 13 can be preferably made of a material suitable for reflection of light and/or it is at least partly fitted with a reflective layer 29d suitable for reflection of light. In this case it reflects the light escaping from the edges of the light-conductive core 15 back into it, thus increasing the efficiency and/or the level of homogeneity of the lighting unit 3.

FIG. 6 shows another embodiment of the lighting unit 3 comprising a light-conductive core 15 with at least one associated light source 11 situated at the entry area 9 of the light-conductive core 15 to emit light rays 10 into the body 14 of the light-conductive core 15. The light-conductive core 15 comprises on its top surface 17 an exit area 30 for the output of light rays 10 conducted through the body 14 out of the light-conductive core 15, the light-conductive core 15 being further fitted on its bottom surface 18 with unbinding elements 19 to focus light rays 10 towards the top surface 17 of the light-conductive core 15. The unbinding elements 19 are situated close to each other or the unbinding element 19 is implemented as a continuous treatment or shaping of the bottom surface 18, e.g. by sand blasting or surface treatment of the injection mold. Opposite the bottom surface 18 of the light-conductive core 15, a reflector 21 is situated and opposite the top surface 17 of the light-conductive core 15, there is a functional layer 23 whose top surface comprises functional elements 26 configured to focus beams of light rays 10 in a pre-determined direction, which is the direction deflected from the normal N to the surface by the angle α in this preferred embodiment. The functional elements 26 are arranged linearly on the surface, having a structure with a sharp-edged sawtooth profile and/or with a sawtooth profile with rounded peaks. The functional layer 23 and reflector 21 are separated from the light-conductive core 15 with a technological layer 24. The technological layer 24 is preferably implemented as an air layer—air gap.

In the context of this invention, the functional layer 23 refers to a layer that is configured to focus beams of light rays 10, or axes of these beams, respectively, in a pre-determined required direction. This required direction can be the direction of the normal N to the surface, or a direction close to the normal N, or a direction deflected from the normal N by the required angle α. However, in addition to the above-mentioned configuration, the functional layer 23 can also be configured (as is the case of the embodiments of FIGS. 25, 26 and 29 below) to act as a homogenizer, i.e. to ensure homogenization—diffusion of light rays 10. In this case, this functional layer 23 then ensures routing of the beam and at least partly the angular diffusion required to meet the legislative requirements of the particular function.

In the context of this invention, the technological layer N is a layer configured for total reflection of light rays 10 conducted in the light-conductive core 15, preferably having a low refractive index, and it can be e.g. an air layer—air gap, or it can e.g. comprise an adhesive with a low refractive index, or a combination of a standard optically pure adhesive with a spray coating or foil with a low refractive index or with surface finish. If the technological layer 24 comprises an adhesive, this layer 24 then fulfills the function of a connecting element at the same time, mutually connecting the planarly shaped parts of the lighting unit it is situated between.

Unbinding elements 19, e.g. diffusion particles, can be distributed in the body 14 of the light-conductive core 15 (but not necessarily).

FIGS. 7 and 8 show another embodiment example of the lighting unit 3 according to the invention wherein a homogenizer 20 is situated between the functional layer 23 and the light-conductive core 15, the homogenizer having a surface or internal volume structure influencing the flow direction of light rays 10. The homogenizer 20 is separated from the light-conductive core 15 at one side and from the functional layer 23 at the other side by technological layers 24, which are preferably air layers or air gaps. The homogenizer 20 is adapted to homogenize—diffuse light rays 10, e.g. it is implemented as milk-white material or another material with a surface or internal volume structure influencing the flow direction of light rays 10. Light rays 10 passing through the homogenizer 20 and exiting from its exit surface 22 can be diffused in an isotropic or anisotropic way.

Another embodiment example of the lighting unit 3 is shown in FIG. 9. Individual light components of the lighting unit 3, i.e. the light-conductive core 15, homogenizer 20, reflector 21 and functional layer 23 are held by a clamping element 27 equipped with separators 28 along their perimeter or a part of their perimeter to produce the required size of the technological layers 24, which are preferably air gaps, and/or to fix individual components in the prescribed position. In an embodiment that is not shown here, the clamping element 27 can be used to snap individual components together, a technological layer 24 being created between the light components of the lighting unit 3, preferably having the form of an air layer/gap by mere free laying with thrust without the use of a separator 28. The clamping element 27 and/or separator 28 is made, in a part of its volume or in its entire volume, of transparent material allowing light rays 10 at least partly through, and/or non-transparent material, the clamping element 27 and/or separator 28 being adapted to create designer elements with its composition, e.g. color.

In another embodiment example of the lighting unit 3 according to the invention, which is shown in FIG. 10, the reflector 21 with the light-conductive core 15, light-conductive core 15 with the homogenizer 20 and the homogenizer 20 with a functional layer 23 are connected to each other and/or spatially separated by means of a connecting element 27, e.g. an adhesive layer or adhesive pad, laser or ultrasonic seal, the connecting element 27 fulfilling the function of the separator 28 at the same time.

In another embodiment example of the lighting unit 3 according to the invention, shown in FIG. 11, the reflector 21 is part of the clamping element 27, the reflector 21 comprising a diffusion or specular reflective layer or being made of a material having reflective diffusion or specular properties. The color of the reflector 21 can be adapted to the color of the light rays 10.

In another embodiment example of the lighting unit 3 according to the invention, shown in FIG. 12, the functional layer 23 and homogenizer 20 form an integral body wherein a functional layer 23 with functional elements 26 implemented in the form of a functional structure is attached to the homogenizing layer or surface. A technological layer 24 is situated between the homogenizer 20 and the light-conductive core 15 and between the light-conductive core 15 and the reflector 21. The technological layer 24 can e.g. comprise an adhesive with a low refractive index or a combination of a standard optically pure adhesive with spray coating or foil with a low refractive index or with surface finish.

In another embodiment example of the lighting unit 3 according to the invention, shown in FIG. 13, the functional layer 23 and homogenizer 20 form an integral body wherein a functional layer 23 whose top surface is fitted with functional elements 26 is attached to the homogenizing layer or surface. The technological layer 24 between the homogenizer 20 and the light-conductive core 15 and between the light-conductive core 15 and the reflector 21 is configured for total reflection of light rays 10 conducted in the light-conductive core 15 while it preferably has a low refractive index and can e.g. have the form of foil, spray coating, adhesive, surface finish or their combination.

In another embodiment example of the lighting unit 3 according to the invention, shown in FIG. 14, the lighting unit 3 comprises a functional layer 23 comprising two functional segments 23a, 23b that are fitted with functional elements 26 consisting of differently oriented functional textures, preferably shifted with respect to each other by 90°, a technological layer 24 consisting of an air layer—air gap being created between the functional segments 23a, 23b.

In another embodiment example of the lighting unit 3 according to the invention, shown in FIG. 15, the inner segment 23a of the functional layer 23 is connected to the homogenizer 20 during production, a technological layer 24 consisting of an air gap being present between the segments 23a and 23b, homogenizer 20 and the light-conductive core 15 and between the light-conductive core 15 and the reflector 21.

In another embodiment example of the lighting unit 3 according to the invention, shown in FIG. 16, a semi-permeable layer 29 is situated above the functional layer 23, implemented e.g. as foil with semi-permeable metal plating to ensure a mirror-like appearance of the lighting unit 3. The semi-permeable layer 29 is adapted to only allow a part of light rays 10 emitted by the functional layer 23 through, a part of light rays 10 being reflected back to the functional layer 23. The semi-permeable layer can be applied all over the surface or over a part of it, which can be preferably used to finalize the designer's intention.

Another embodiment example of the lighting unit 3 according to the invention is shown in FIG. 17. This embodiment differs from the embodiment of FIG. 16 in that the homogenizer 20 and the inner segment 23a are separated by a technological layer 24. In this embodiment, the technological layers 24 consist of air gaps.

Figure 18:
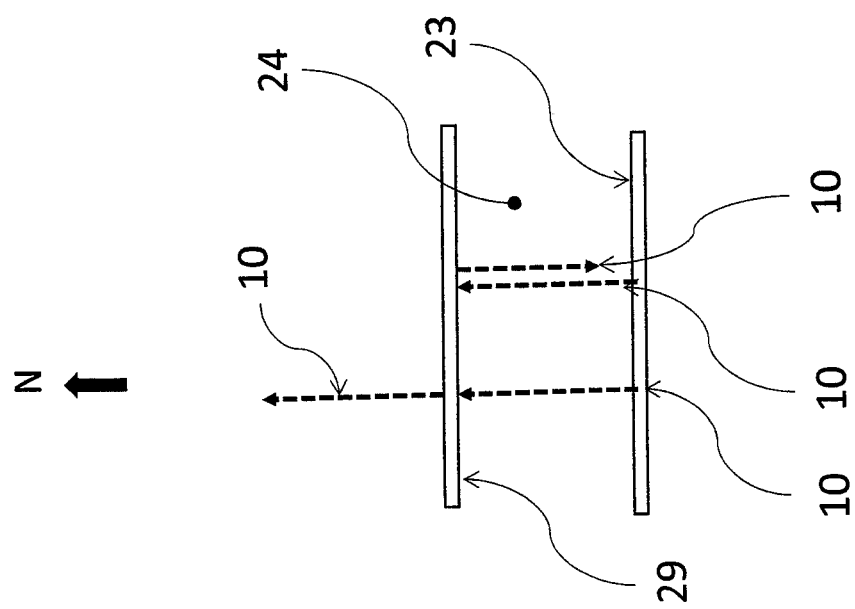

As shown in FIG. 18, the semi-permeable layer 29 is adapted to only allow a part of light rays 10 emitted by the functional layer 23 through, a part of light rays 10 being reflected back to the functional layer 23.

Figure 19:
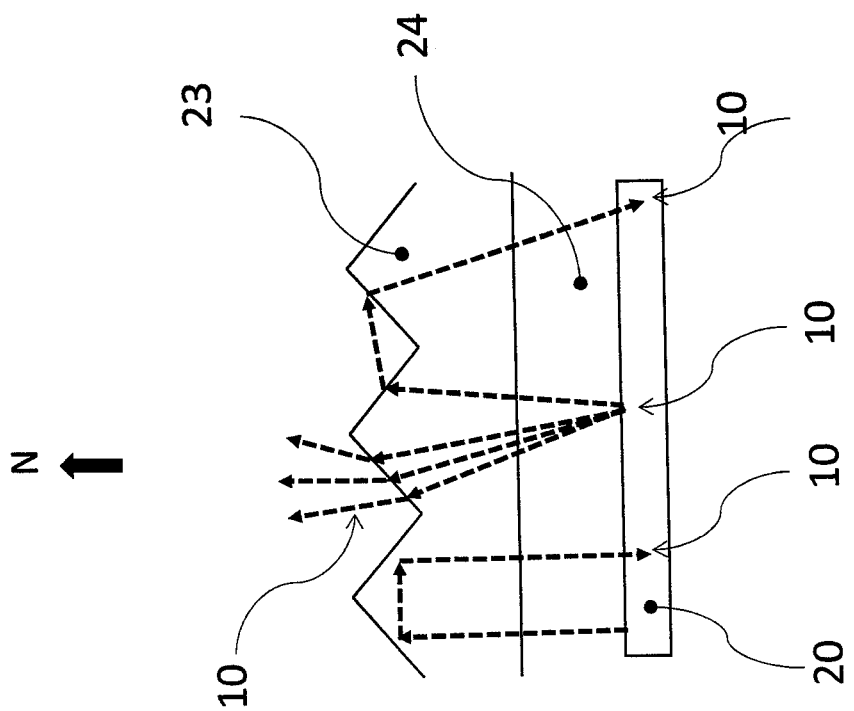

As shown in FIG. 19, the functional layer 23 or its segments 23a, 23b are adapted to make sure that a part of light rays 10 will pass in a direction close to the normal N direction to the general surface and a part is reflected back. The reflected light rays 10 are bound back to the light-conductive core 15.

Figure 20:
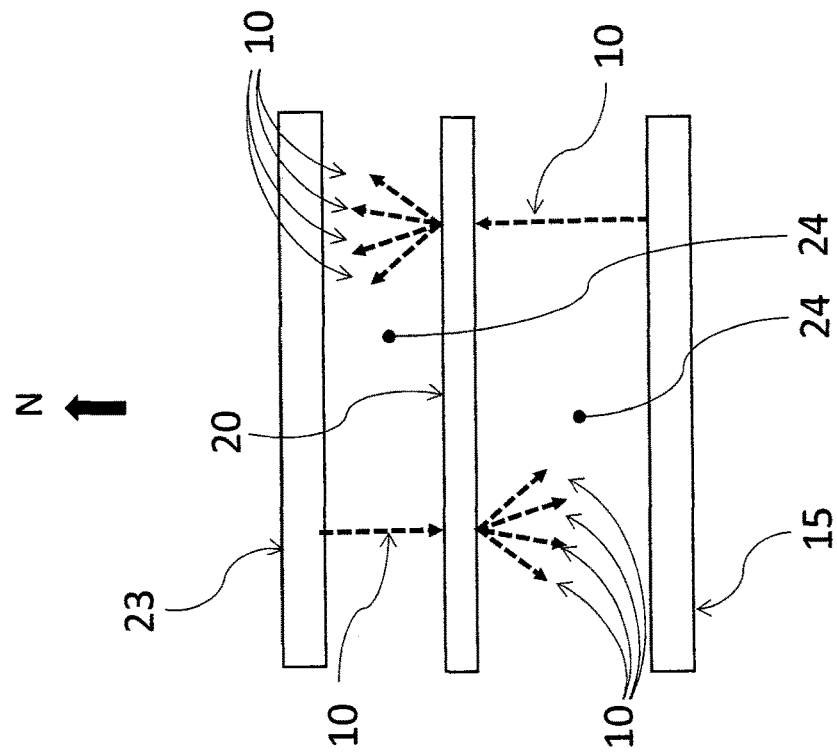

As shown in FIGS. 17 and 20, the homogenizer 20 diffuses the light beam 10 emitted from the light-conductive core 15 or reflected from the functional layer 23 and/or semi-permeable layer 29.

As shown in FIGS. 17 and 21, the reflector 21 reflects or diffuses the light beam 10 emitted from the light-conductive core 15 to ensure binding of light rays 10 to the light-conductive core 15 again.

As indicated in FIGS. 22 to 24, the unbinding elements 19 of the light-conductive core 15 can be implemented in various textural patterns with or without a directional orientation of their unbinding areas.

According to the embodiment example shown in FIG. 25, the functional layer 23 is implemented in such a way that besides being configured to focus the (axes of) beams of light rays 10 in the normal N direction (or in a direction close to the normal N) to the surface, it is also configured to homogenize light rays 10, acting as a homogenizer at the same time. Diffusion of light rays 10 is achieved through a surface diffusion structure 31, e.g. by means of an acquired texture imprinted into foil.

According to the embodiment example shown in FIG. 26, the functional layer 23 is implemented in such a way that besides being configured to focus the (axes of) beams of light rays 10 in the normal n direction (or in a direction close to the normal N) to the surface, it is also configured to homogenize light rays 10, acting as a homogenizer at the same time. Diffusion of light rays 10 is achieved through a volume diffusion structure 31, e.g. by means of diffusion particles inside the functional layer 23.

FIG. 27 shows an embodiment example wherein the entry area 9 of the light-conductive core 15 designed to emit light rays 10 to the body 14 of the light-conductive core 15 is situated on the top surface 17 of the light-conductive core 15.

FIG. 28 shows an embodiment example wherein the entry area 9 of the light-conductive core 15 designed to emit light rays 10 to the body 14 of the light-conductive core 15 is situated on the bottom surface 18 of the light-conductive core 15.

According to the embodiment example shown in FIG. 29, the unbinding elements 19 of the light-conductive core 15 can be implemented in various textural patterns to focus light rays in the direction of the normal n or in a direction close to the normal n, the use of the reflector 21 not being necessary. In this embodiment example, the functional layer 23 is implemented in such a way that besides being configured to focus the (axes of) beams of light rays 10 in the normal N direction (or in a direction close to the normal N)

to the surface, it is also configured to homogenize light rays 10, acting as a homogenizer at the same time.

The lighting unit 3 according to the invention, and thus also individual layers contained in it, can be spatially shaped, so it e.g. suitably follows the contours of the car body with its spatial shape in the place where it is situated in the vehicle. The spatially shaped lighting unit 3 can be e.g. corrugated, of a convex or concave shape, curved etc.

The thickness of the lighting unit 3 is preferably from 0.5 mm to 14 mm.

The present invention makes is possible for the light device to contain multiple lighting units 3. The lighting units 3 can be arranged in the space of the lamp body e.g. in such a way that some of the lighting units 3 will fulfill the requirements for the main beam and conversely, some of them will be designed to ensure visibility and/or to meet designer requirements. But at the same time, all the lighting units 3 of one lighting function must collectively meet the requirements of the legislative regulation for the particular function. Lighting units 3 can also be combined in such a way that one or more lighting units 3 are common for more lighting functions of the same color or more colors. E.g. a combination of the stop and tail function or the tail and turn indication function. Or a functional layer of one lighting unit can be designed in such a way to emit a part of the light to meet the requirement for visibility angles.

Thus, the functional layer 23 can fulfill several functions at the same time. On the one hand, it directs the light beam to the required directions, and at the same time, it recycles light rays emitted to unwanted directions, thus increasing the efficiency of the system because this light would be lost for the purposes of signal lighting. In other words, it need not necessarily be emitted to these unwanted directions. In addition, a situation may occur in certain cases when this light routed to unwanted directions would cause exceeding of the permitted maximum.

The simplest configuration and at the same time the most efficient one from the legislative point of view is such that the active surface 4 is situated perpendicularly to the longitudinal axis of the vehicle and has a planar shape. In this case, the system has the lowest losses caused by supplementary routing of light to the required angles of the main beam. However, this configuration is not always suitable for the style of the vehicle. Therefore, the functional layer 23, or a combination of functional layers 23 is adapted to redirect the main axis of the beam exiting from the active surface 4. If there is a requirement that the active surface 4 or surfaces 4 should be shaped and curved on the basis of designer requirements, optical analyses should be carried out and their results used to optimize the unbinding elements 19 and/or the functional layer 23 or their combination to meet the legislative requirements for the particular function.

At present, motor vehicles are equipped with signal lamps designed to emit various light beams. Such signal lamps can be integrated in the body as separate lighting elements or they can be an integral part of headlights and tail lights in the form of a partial lighting unit.

Such functions are considered as signal functions that do not directly illuminate the space in front of the vehicle, but enhance road traffic safety by helping to improve visibility of the respective vehicle for the other road traffic participants. This mainly relates to the following functions:

DRL—Daytime running light, of white color
Turn indicator, of amber or red color
Front position light, of white color
Front parking light, of white color
Tail light, of red color
Stop light, of red color
High mount stop light (HMSL), or red color
Side marker, of white, amber or red color Besides the required color of the light beam, each of the signal functions is characterized by visibility, which is based on the required directions and propagation angles of the light beam both on the horizontal and vertical plane as well as photometric requirements where in various angular areas in front of/behind the vehicle there are various areas with various required luminous intensity values.

The luminous intensity aspect will be further explained in a more detailed way with reference to FIGS. 34 and 35.

FIG. 34 shows an example of the angular distribution of luminous intensity in the light trace for the stop function implemented with the light device according to the invention. From the point of view of luminous intensity distribution, the light trace can be divided into several areas in an imaginary way. Area a is the area where the light device in the stop function mode achieves its highest luminous intensity (100% luminous intensity) and at all the points of this area the luminous intensity does not decrease below 75% of the maximum luminous intensity. Similarly, in all the places of area b, the luminous intensity is found within the interval from 50% to 75% of the maximum luminous intensity, in area c it is the interval of 25% to 50% of the maximum luminous intensity and in area d it is the interval from 0% to 25% of the maximum luminous intensity. Similarly, FIG. 35 shows an example of angular distribution of luminous intensity of a tail light implemented with the light device according to the invention.

It should be noted here that the light device according to the invention can comprise more lighting units 3. In such a case, such desirable resulting luminous intensity distribution as e.g. the exemplary distributions for the above-mentioned signal functions shown in FIGS. 34 and 35 is achieved through a collective effect of the lighting units 3 that are collectively active for the particular function of the light device.

FIG. 30 and FIG. 31 schematically show examples of some front signal functions that can be implemented with the light device according to the invention with a different light distribution for individual light functions.

E.g. for the daytime running light function, it is desirable for the light device of the daytime running light to achieve the highest luminous intensity in the angular area delimited on the horizontal plane (FIG. 31) by the inner angle γh1 and the outer angle γh2 related to the light propagation direction parallel to the longitudinal axis of the vehicle X, and on the vertical plane (FIG. 30) by the top angle γv1 and the bottom angle γv2 related to the light propagation direction.

Similarly, as shown in FIGS. 30 and 31, for the front turn indicator the angular area where the light device of the turn indicator achieves the highest luminous intensity values is delimited by the respective angles ∝fh1, ∝fh2, ∝fv1, ∝fv2 related to the light propagation direction parallel to the longitudinal axis of the vehicle X. For the front position light, the angular area where the light device of the front position light achieves the highest luminous intensity values is delimited by the respective angles βh1, βh2, βv1, βv2 related to the light propagation direction parallel to the longitudinal axis of the vehicle X.

FIG. 32 and FIG. 33 schematically show examples of several rear signal functions. So e.g. for the rear stop light, the angular area where this light achieves its highest luminous intensity is delimited by the respective angles δh1, δh2, δv1, δv2 related to the light propagation direction parallel to the longitudinal axis of the vehicle X, and for the rear turn indicator, the angular area with the highest luminous intensity values is delimited by the angles ∝bh1, ∝bv1, ∝bh2, ∝bv2 related to the light propagation direction parallel to the longitudinal axis of the vehicle X.

The functional layer 23 of the light unit according to the invention is generally configured to direct beams of light rays 10 that exit from its surface averted from the light-conductive core 15 to a pre-determined direction or directions (there may be multiple directions e.g. if the functional layer 23 is curved or otherwise spatially shaped). In this case, the aim of this configuration is to make sure that the light device, if it is in the mode of the particular light function, achieves its highest luminous intensities for this function within a pre-determined angle defined by a certain direction with respect to the longitudinal axis of the vehicle and angular diffusion from this direction. In all the areas outside the above-mentioned pre-determined angle with the highest luminous intensities, the luminous intensities are lower, representing only fractions of the highest luminous intensity values (see e.g. FIGS. 34 and 35).

Figure 36:
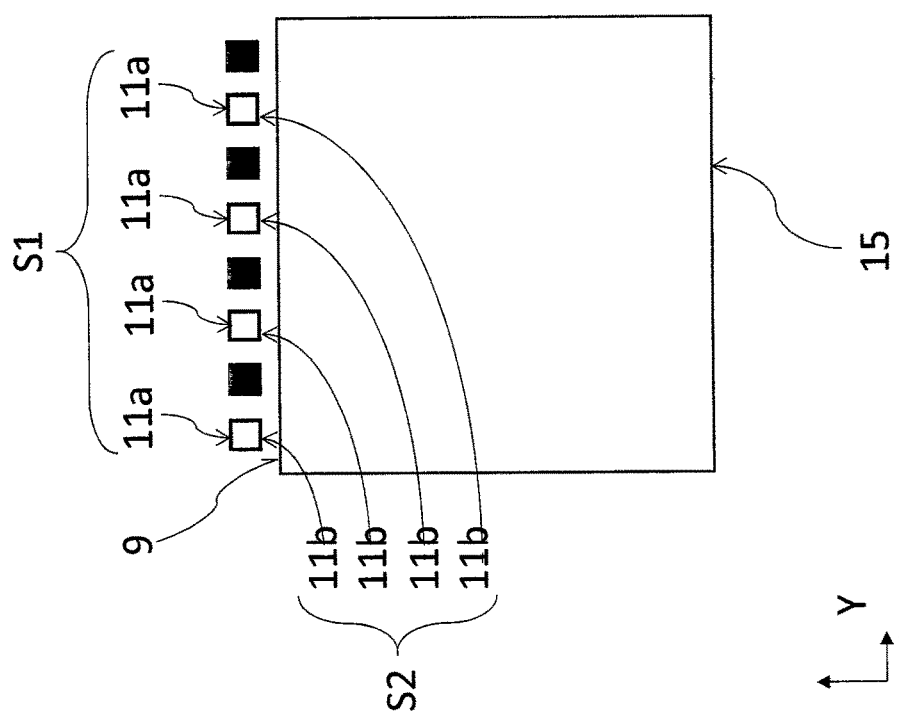

FIG. 36 shows a lighting device comprising a higher number of primary light sources 11a and secondary light sources 11b arranged next to each other in two light groups S1, S2 fulfilling a different light or color function (Amber=Turn, Red=Tail/Stop), individual light sources 11a, 11b being mounted on a not shown carrying element 12, e.g. a PCB, in one row and alternately in such a way that the primary light source 11a (Red LEDs) is part of the primary light group S1 and the secondary light source 11b (Amber LEDs) is part of the secondary light group S2. Light emitted from the LED light sources (11a, 11b) is bound to the entry area 9 of the light-conductive core 15.

Figure 37:
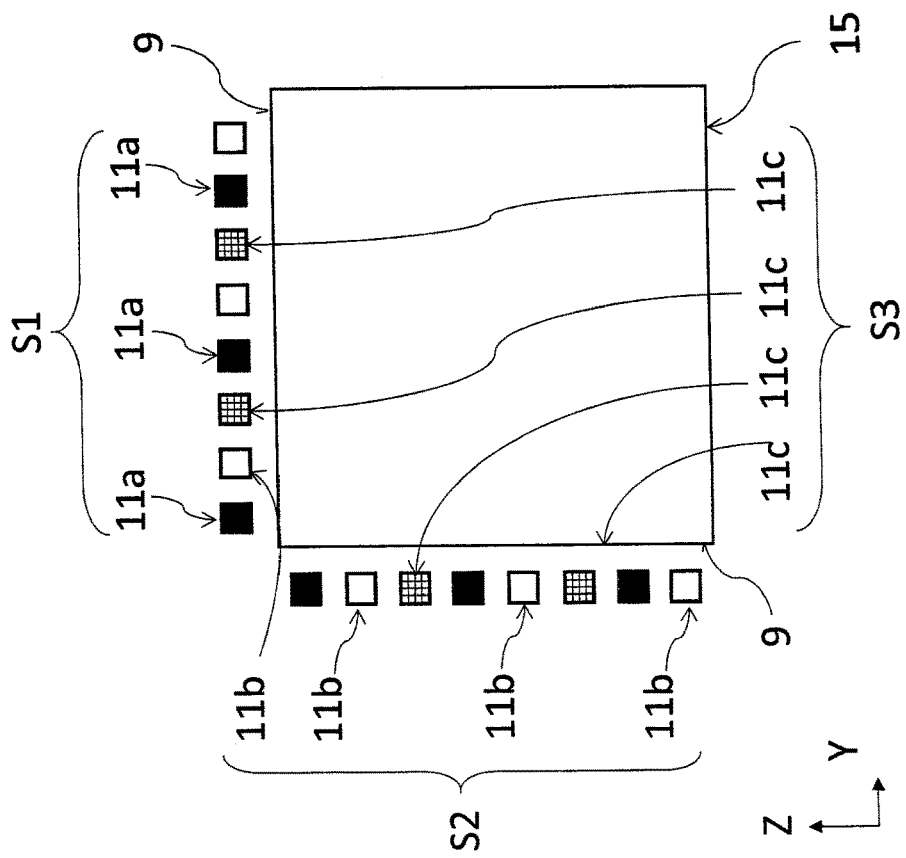

FIG. 37 shows a lighting device comprising a higher number of primary light sources 11a and secondary light sources 11b and tertiary light sources 11c, arranged next to each other in two light groups S1, S2, S3 fulfilling a different light or color function (Amber=Turn, Red-Tail, Red-Stop). Individual light sources 11a, 11b, 11c are mounted on two different entry areas 9 of the light-conductive core 15 while at one output area the light sources 11a, 11b, 11c are arranged in one row and alternately in such a way that the primary light source 11a (Red LEDs) is part of the primary light group S1, the secondary light source 11b (Amber LEDs) is part of the secondary light group S2 and the tertiary light source 11c (Red LEDs) is part of the tertiary light group S3.

FIG. 38 shows a lighting device comprising a higher number of primary light sources 11a and secondary light sources 11b, tertiary light sources 11c and quaternary light sources 11d, arranged at four different entry areas 9 of the light-conductive core 15. The light sources 11a, 11b, 11c, 11d are arranged in four light groups S1, S2, S3, S4 fulfilling a different light or color function (Amber=Turn, Red-Tail, Red-Stop, Non-automotive) in such a way that the primary light source 11a (Red LEDs) is part of the primary light group S1, the secondary light source 11b (Amber LEDs) is part of the secondary light group S2, the tertiary light source 11c (Red LEDs) is part of the tertiary light group S3 and the quaternary light source 11c (Blue/green LEDs) is part of the quaternary light group S4. The light group S4 enables emitting of green, blue or otherwise colored light sources, especially in a non-operational or autonomous mode of the vehicles.

Figure 39:
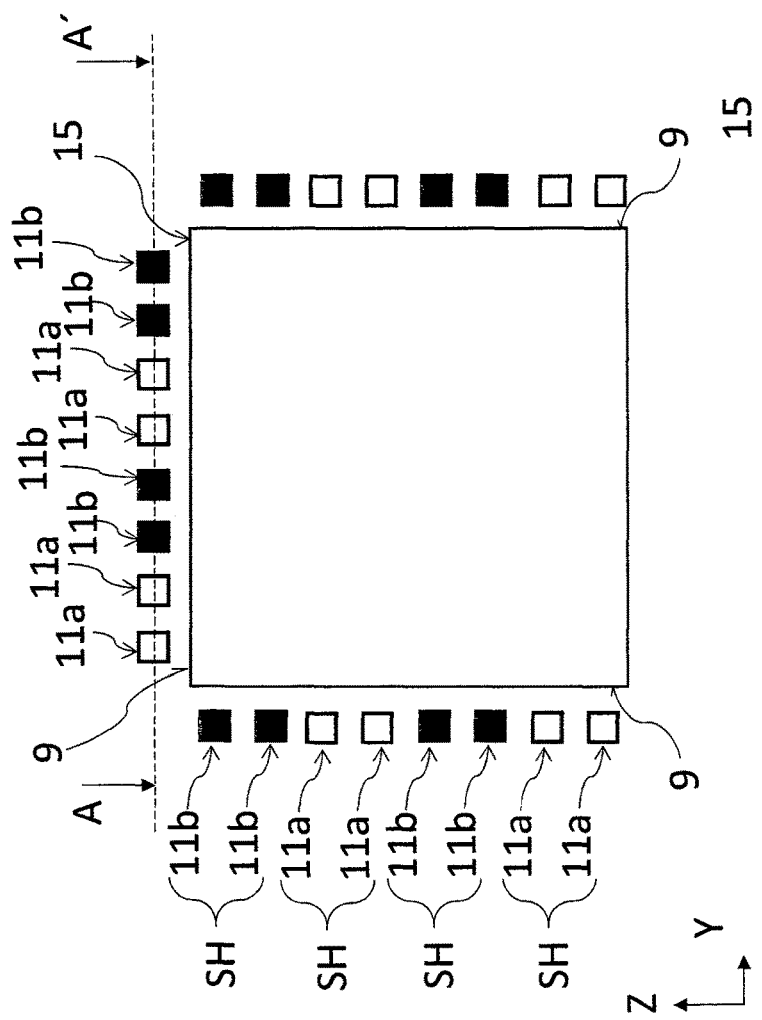

FIGS. 39 and 40 show a lighting device comprising a higher number of primary light sources 11a and secondary light sources 11b arranged at the entry area 9 of the light-conductive core 15 in two rows in arrays SH next to each other in an alternate/staggered way. The arrays SH of the primary light sources 11a form the light group S1 and the arrays SH of the secondary light sources 11b form the light group S2, which is not shown here. The light groups S1, S2, which are not shown here, fulfill a different light or color function (Amber=Turn, DRL), individual light sources 11a, 11b being situated in two rows and alternately in the arrays SH in such a way that the primary light source 11a (Red LEDs) is part of the primary light group S1 and the secondary light source 11b (DRL LEDs) is part of the secondary light group S2.

As shown in FIG. 41, the lighting unit 3 is generally configured to direct different light beams 10s of light rays 10 that exit from its active surface 4. At the same time, the lighting unit 3 is designed in such a way for the light device, if it is in the mode of the particular light function, to achieve the required luminous intensities in the pre-determined areas a, b, c, d.

As shown in FIG. 42, the lighting unit is generally configured to direct different light beams 10s of light rays 10 from different lighting units 3 that exit from their active surfaces 4. At the same time, the light device is designed, in the mode of the particular light function, to achieve the required luminous intensities in the pre-determined areas a, b, c, d.

As indicated in FIGS. 43 to 46, the lighting unit can also be configured for the output and routing of various light beams 10s of light rays 10 from at least one of the lateral exit surfaces 25 of one or more layers that are contained in the lighting unit 3. At least one lateral exit surface 25 can be situated on the functional layer 23 and/or homogenizer 20 and/or the light-conductive core 15.

In the embodiment examples of FIGS. 43 to 46, the covering mask 13 and/or reflector 21 is part of the carrier 8 while the carrier 8 can be multi-layered, e.g. as a multi-injection plastic molding or as plastic substrate fitted at least on one sided with surface finish in the form of varnish, foil, graining etc.

Figure 43:
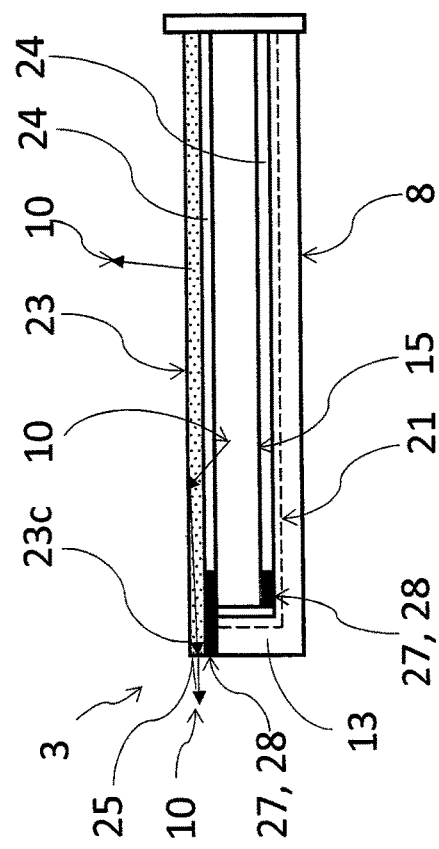

As shown in FIG. 43, in this embodiment, the lighting unit 3 comprises at least one functional layer 23 for optical processing, especially diffusing, routing or changing the color spectrum of light rays 10 emitted by the light-conductive core 15. The light-conductive core 15 is attached to the carrier 8 and the functional layer 23 by means of a clamping element 27, the clamping element 27 being preferably designed as a separator to form the technological layer 24. The functional layer 23 is equipped with at least one protrusion 23c that extends in the lateral direction beyond the lateral edge of the light-conductive core 15, is fitted with a lateral exit surface 25 and is firmly connected, by means of the clamping element 27, to the lateral part of the covering mask 13 integrated in the carrier 8, which means that the functional layer 23 is directly carried by the carrier 8 as well as the light-conductive core 15.

Figure 44:
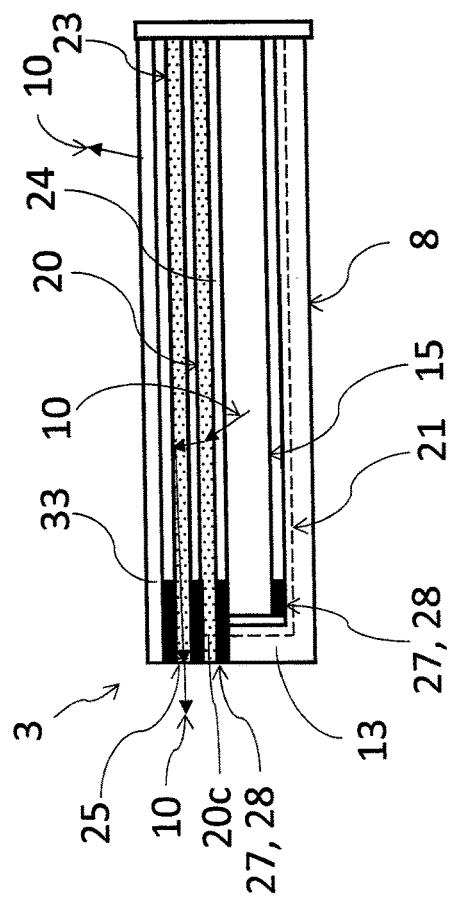

FIG. 44 shows the lighting unit 3 that comprises at least one homogenizer 20 for further optical processing, especially diffusing, routing or changing the color spectrum of light rays 10 emitted by the light-conductive core 15. The homogenizer 20 is only connected to the functional layer 23 by means of a clamping element 27, the clamping element 27 being preferably designed as a separator to form the technological layer 24. The homogenizer 20 is equipped with at least one protrusion 20c that extends in the lateral direction beyond the lateral edge of the light-conductive core 15 and is fitted with a lateral exit surface 25. The lighting unit 3 further comprises at least one covering layer 33 to produce various colored appearances in the view of the lighting unit 3, especially of its active area 4. The covering layer 33 can also comprise designer structures to create appearance textures in the region of the active area 4.

Figure 47:
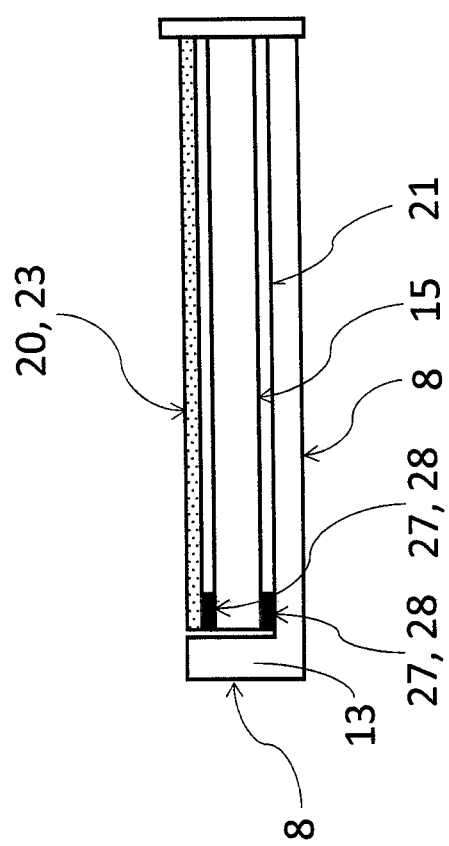

FIG. 47 shows an embodiment example comprising at least one covering mask 13 integrated with the carrier 8 and/or reflector 21 to cover the lighting unit 3 from a side.

Figure 48:
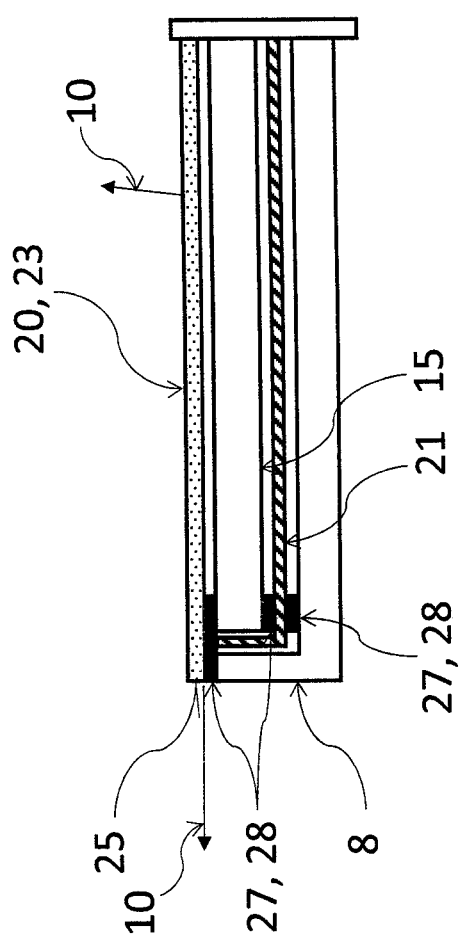

The reference signs 20 and 23 if FIGS. 47, 48, 49 and 51 refer to a layer that can be either the functional layer 23 or homogenizer 20 in these embodiments FIG. 48 shows an embodiment example comprising a reflector 21 the shape of which is configured to cover the light-conductive core 15 from as side. The functional layer 23, which can be also replaced with a homogenizer 20 in this embodiment, has an uncovered lateral exit surface 25 through which light rays 10 can exit the lighting unit 3.

The embodiment example of FIG. 49 comprises a carrier 8 the shape of which is configured to cover the light-conductive core 15 from a side while a covering mask 13 is attached to the carrier 8 by means of a clamping element 27. The clamping element 27 can be implemented as glue, a clip or a weld etc.

The embodiment example of the light device a part of which is shown in FIG. 50 comprises an assembly of carriers 8 and 8b connected with clamping elements 27, a part of the light unit 7 being configured as a carrier 8b. The light device further comprises a primary optical element 32 to direct light rays 10 from the light source 11 of the light unit 7 to the light-conductive core 15. The primary optical element 32 may be designed as a separate component or it may be an integral part of the light-conductive core 15 or be connected to the light unit 7.

The embodiment example of the light device a part of which is shown in FIG. 51 comprises a carrier housing 1 and a carrier 8b comprising a light unit 7 attached to the carrier housing by means of a clamping element 27, which may preferably be an adhesive tape. The carrier 8b supports the lighting unit 3. Another carrier 8 has such a shape that is configured to cover the lighting unit 3 from a side, except the functional layer 23, instead of which a homogenizer 20 can also be used in this case, whose lateral exit surface 25 is uncovered and light rays 10 from the lighting unit 3 can exit through it. A primary optical element 32 is connected to the light-conductive core 15 while the primary optical element comprises the entry optical system used to guide light from the light source 11 to the light-conductive core 15 and to direct light in such a way as to fill the light-conductive core 15 with light as homogeneously as possible.

The light device shown in FIGS. 52 and 53 comprises a light-conductive core 15 that is, in a part of its outer edge, equipped with a reflective segment 15a, e.g. in the form of a reflective tape, foil, varnish or a sprayed layer of a reflective material.

The functional layer 23 and/or homogenizer 20 can be, in at least a part of their volume or surface, designed in various color modifications to achieve the desired output characteristic of the light function and/or for an interesting designer outer appearance of the lighting unit 3.

LIST OF REFERENCE MARKS

1—housing
2—chamber
3—lighting unit
4—active area
5—system
6—assembly
7—light unit
8a, 8b—carrier
9—entry area
10—light ray
10s—light beam
11—light source
11a—primary light source
11b—secondary light source
11c—tertiary light source
11d—quaternary light source
12—carrying element
13—covering mask
14—body
15—light-conductive core
15a—reflective segment
16—unbinding element
17—top surface
18—bottom surface
19—unbinding element
20—homogenizer
20c—protrusion
21—reflector
22—exit surface
23—functional layer
23a—segment
23b—segment
23c—protrusion
24—technological layer
25—lateral exit surface
26—functional element
27—clamping element
28—separator
29—semi-permeable layer
29a—transparent segment
29b—non-transparent segment
29c—partly transparent segment
29d—reflective layer
30—exit area
31—diffusion structure
32—primary optical element
33—covering layer
N—normal to the surface
a—angle
S1—light group
S2—light group
S3—light group
SH—array
a—area
b—area
c—area
d—area
X—longitudinal axis of the vehicle
Y, Z coordinates of the Cartesian coordinate system

The invention claimed is:

1. A signal light device of a motor vehicle designed to fulfill one or more signal light functions, the signal light device comprising an internal chamber that is covered by a cover which separates the signal light device from external surroundings of the motor vehicle, the internal chamber comprising at least one panel-shaped signal lighting unit having:
(i) an active area for the exit of light rays from the signal lighting unit that is situated opposite the cover,
(ii) a light-conductive core of an optically transparent material, wherein the light conductive core comprises a body, a top surface, a bottom surface, and an entry area, and (iii) an associated signal light unit located opposite the entry area of the light-conductive core to emit light rays into the body of the light-conductive core, wherein, between the light-conductive core and the cover, there is a homogenizer layer configured to diffuse the light rays that exit a surface of the homogenizer layer averted from the light-conductive core, wherein the signal light device further contains a first air layer situated between the homogenizer layer and the light-conductive core, the first air layer being in contact with the top surface of the light-conductive core and the homogenizer layer, wherein the signal light device further contains a reflector surface facing the bottom surface of the light-conductive core and configured to reflect the light rays escaping through the bottom surface from the light-conductive core, wherein the signal light device further contains a second air layer situated between and in contact with the reflector surface and the bottom surface of the light-conductive core, wherein the bottom surface of the light-conductive core is provided with unbinding elements to redirect the light rays towards the top surface of the light-conductive core, and wherein the signal lighting unit, the light-conductive core, the first and second air layers, and the homogenizer layer are curved, in order for the signal lighting unit to meet angular luminous intensities prescribed for signal light function the signal light device is fulfilling so that the active area of the signal lighting unit follows the contours of the car body in the place where the signal lighting body is built in the car body.

2. The signal light device in accordance with claim 1, wherein the signal lighting unit, the light-conductive core, the first and second air layers, and the homogenizer layer are curved to produce a light cone having a highest luminous intensity with an angle of +/−10 degrees horizontally and +/−5 degrees vertically, where the highest luminous intensity of the light cone ranges from 75% of a maximum luminous intensity of the signal lighting device to 100% of the maximum luminous intensity.

3. The signal light device in accordance with claim 1, wherein the cover comprises a translucent cover.

4. The signal light device in accordance with claim 1, wherein, between the homogenizer layer and the cover, a functional layer is situated, wherein the functional layer is configured to partially collimate the light rays that exit a surface of the functional layer averted from the light-conductive core in a predetermined direction or directions.

5. The signal light device in accordance with claim 4, wherein the light device comprises a technological layer that separates the homogenizer layer from the functional layer, wherein the technological layer is in contact with the homogenizer layer and the functional layer.

6. The signal light device in accordance with claim 4, wherein the functional layer comprises functional elements that are arranged on a surface of the functional layer and/or are part of an internal structure of the functional layer, wherein the functional elements are adapted to partially collimate the light rays exiting from the surface of the functional layer averted from the light-conductive core in a pre-determined direction.

7. The signal light device in accordance with claim 6, wherein the pre-determined direction is a direction parallel to or close to the direction of the normal (N) to the surface averted from the light-conductive core.

8. The signal light device in accordance with claim 6, wherein the pre-determined direction is a direction deflected from the normal (N) to the surface averted from the light-conductive core by a pre-determined acute angle (a).

9. The signal light device in accordance with claim 1, wherein between the homogenizer layer and the cover two functional layer segments arranged above each other are situated, wherein each of the two functional layer segments comprise a top surface, wherein at least one of the functional layer segments is fitted with functional elements arranged on a surface of and/or inside the functional layer segment, wherein the light device comprises a fourth air layer located between and contacting the two layer segments, wherein the two functional layer segments are configured to partially collimate the light rays that exit a surface of an upper functional layer segment averted from the light-conductive core in a predetermined direction or directions.

10. The signal light device in accordance with claim 6, wherein the functional elements that are arranged on the surface are arranged linearly on the surface and have a sharp-edged sawtooth profile or a sawtooth profile with rounded peaks.

11. The signal light device in accordance with claim 1, further comprising a covering mask positioned at a front side before the light unit, wherein the covering mask comprises a shape of a frame that is made of a material suitable for reflection of light and/or is at least partly fitted with a surface finish suitable for reflection of light.

12. The signal light device in accordance with claim 5, wherein the technological layer consists of a third air layer.

13. The signal light device in accordance with claim 5, wherein the technological layer comprises foil, a spray coating, and/or a surface finish.

14. The signal light device in accordance with claim 5, wherein the technological layer comprises an adhesive layer that is positioned between two panel-shaped parts of the lighting unit and which acts as a connecting element between the two panel-shaped parts.

15. The signal light device in accordance with claim 14, wherein the lighting unit comprises at least one clamping element in the form of a frame encircling an assembly of the panel-shaped parts of the lighting unit, wherein the clamping element is positioned at a lateral side of the lighting unit and is configured to hold the panel-shaped parts in a required position.

16. The signal light device in accordance with claim 15, wherein the lighting unit comprises separators to create a required thickness of the first and second air layers.

17. The signal light device in accordance with claim 16, wherein the separators are part of the frame.

18. The signal light device in accordance with claim 14, wherein the lighting unit comprises clamping elements situated in the technological layer to thereby maintain a required thickness of the technological layer and to connect the panel-shaped parts of the lighting unit separated by the technological layer.

19. The signal light device in accordance with claim 18, wherein the clamping elements consist of an adhesive layer, adhesive pads, laser seals, and/or ultrasonic seals.

20. The signal light device in accordance with claim 1, wherein the light sources of the light unit are LED sources.

21. The signal light device in accordance with claim 1, wherein the thickness of the lighting unit is from 0.5 mm to 14 mm.

22. The signal light device in accordance with claim 1, wherein a bottom side of the lighting unit is mounted on a carrier that is made of a material suitable for reflection of light and/or is at least partly fitted with a surface finish suitable for reflection of light, fulfilling the function of the reflector surface at the same time.

23. The signal light device in accordance with claim 9, wherein each of the functional layer segments is fitted with functional elements arranged linearly on an upper surface of the functional layer segment, the linear arrangements of the functional elements on the two functional layer segments being mutually differently oriented.

24. The signal light device in accordance with claim 9, wherein the light device either comprises a third air layer being in contact with and positioned between the lower functional layer segment and the homogenizing layer or the lower functional layer segment and the homogenizing layer are in contact with each other.

* * * * *